US010027688B2

(12) United States Patent
Perdisci et al.

(10) Patent No.: US 10,027,688 B2
(45) Date of Patent: Jul. 17, 2018

(54) METHOD AND SYSTEM FOR DETECTING MALICIOUS AND/OR BOTNET-RELATED DOMAIN NAMES

(75) Inventors: Roberto Perdisci, Kennesaw, GA (US); Wenke Lee, Atlanta, GA (US)

(73) Assignee: Damballa, Inc., Atlanta, GA (US)

( * ) Notice: Subject to any disclaimer, the term of this patent is extended or adjusted under 35 U.S.C. 154(b) by 0 days.

(21) Appl. No.: 12/538,612

(22) Filed: Aug. 10, 2009

(65) Prior Publication Data
US 2010/0037314 A1 Feb. 11, 2010

Related U.S. Application Data

(60) Provisional application No. 61/087,873, filed on Aug. 11, 2008.

(51) Int. Cl.
*G06F 21/00* (2013.01)
*H04L 29/06* (2006.01)

(52) U.S. Cl.
CPC .... *H04L 63/1416* (2013.01); *H04L 2463/144* (2013.01)

(58) Field of Classification Search
CPC H04L 63/1416; H04L 2463/144; G06F 21/00
USPC .......................................................... 726/22
See application file for complete search history.

(56) References Cited

U.S. PATENT DOCUMENTS

| 4,843,540 | A | 6/1989 | Stolfo |
| 4,860,201 | A | 8/1989 | Stolfo et al. |
| 5,363,473 | A | 11/1994 | Stolfo et al. |
| 5,497,486 | A | 3/1996 | Stolfo et al. |
| 5,563,783 | A | 10/1996 | Stolfo et al. |
| 5,668,897 | A | 9/1997 | Stolfo |
| 5,717,915 | A | 2/1998 | Stolfo et al. |
| 5,748,780 | A | 3/1998 | Stolfo |
| 5,920,848 | A | 7/1999 | Schultzer et al. |
| 6,401,118 | B1 | 6/2002 | Thomas |

(Continued)

FOREIGN PATENT DOCUMENTS

| WO | WO 02/37730 | 5/2002 |
| WO | WO 02/098100 | 12/2002 |
| WO | WO 2007/050244 | 5/2007 |

OTHER PUBLICATIONS

Stephan Axelsson, "The Base-Rate Fallacy and the Difficulty of Intrusion Detection", ACM Transactions on Information and System Security, vol. 3, No. 3, pp. 186-205 (Aug. 2000).

(Continued)

*Primary Examiner* — Saleh Najjar
*Assistant Examiner* — Devin E Almeida
(74) *Attorney, Agent, or Firm* — Pepper Hamilton LLP

(57) ABSTRACT

A method and system of detecting a malicious and/or botnet-related domain name, comprising: reviewing a domain name used in Domain Name System (DNS) traffic in a network; searching for information about the domain name, the information related to: information about the domain name in a domain name white list and/or a domain name suspicious list; and information about the domain name using an Internet search engine, wherein the Internet search engine determines if there are no search results or search results with a link to at least one malware analysis site; and designating the domain name as malicious and/or botnet-related based on the information.

22 Claims, 7 Drawing Sheets

(56) References Cited

U.S. PATENT DOCUMENTS

| | | | |
|---|---|---|---|
| 6,738,908 B1 | 5/2004 | Bonn et al. | |
| 6,983,320 B1 | 1/2006 | Thomas et al. | |
| 7,013,323 B1 | 3/2006 | Thomas et al. | |
| 7,039,721 B1 | 5/2006 | Wu et al. | |
| 7,043,759 B2 | 5/2006 | Kaaschoek et al. | |
| 7,069,249 B2 | 6/2006 | Stolfo et al. | |
| 7,093,292 B1 | 8/2006 | Pantuso | |
| 7,136,932 B1 | 11/2006 | Schneider | |
| 7,152,242 B2 | 12/2006 | Douglas | |
| 7,162,741 B2 | 1/2007 | Eskin et al. | |
| 7,185,368 B2 | 2/2007 | Copeland, III | |
| 7,203,959 B2 | 4/2007 | Nachenberg et al. | |
| 7,225,343 B1 | 5/2007 | Honig et al. | |
| 7,277,961 B1 | 10/2007 | Smith et al. | |
| 7,278,163 B2 | 10/2007 | Banzhof | |
| 7,290,283 B2 | 10/2007 | Copeland, III | |
| 7,331,060 B1 | 2/2008 | Ricciulli | |
| 7,372,809 B2 | 5/2008 | Chen et al. | |
| 7,383,577 B2 | 6/2008 | Hrastar et al. | |
| 7,424,619 B1 | 9/2008 | Fan et al. | |
| 7,426,576 B1 | 9/2008 | Banga et al. | |
| 7,448,084 B1 | 11/2008 | Apap et al. | |
| 7,475,426 B2 | 1/2009 | Copeland, III | |
| 7,483,947 B2 | 1/2009 | Starbuck | |
| 7,487,544 B2 | 2/2009 | Schultz et al. | |
| 7,512,980 B2 | 3/2009 | Copeland et al. | |
| 7,519,818 B2 * | 4/2009 | Levin | G06F 21/606 713/168 |
| 7,519,994 B2 * | 4/2009 | Judge | G06F 21/55 713/150 |
| 7,536,360 B2 | 5/2009 | Stolfo et al. | |
| 7,549,169 B1 | 6/2009 | Sobel et al. | |
| 7,634,808 B1 * | 12/2009 | Szor | H04L 63/1416 709/223 |
| 7,639,714 B2 | 12/2009 | Stolfo et al. | |
| 7,644,150 B1 | 1/2010 | Nucci et al. | |
| 7,644,151 B2 | 1/2010 | Jerrim et al. | |
| 7,657,935 B2 | 2/2010 | Stolfo et al. | |
| 7,665,131 B2 | 2/2010 | Goodman | |
| 7,698,442 B1 * | 4/2010 | Krishnamurthy et al. ... 709/229 | |
| 7,712,132 B1 | 5/2010 | Ogilvie | |
| 7,712,134 B1 | 5/2010 | Nucci et al. | |
| 7,752,125 B1 | 7/2010 | Kothari et al. | |
| 7,752,665 B1 | 7/2010 | Robertson et al. | |
| 7,779,463 B2 | 8/2010 | Stolfo et al. | |
| 7,784,097 B1 | 8/2010 | Stolfo et al. | |
| 7,809,670 B2 | 10/2010 | Lee et al. | |
| 7,818,797 B1 | 10/2010 | Fan et al. | |
| 7,882,542 B2 | 2/2011 | Neystadt | |
| 7,886,358 B2 | 2/2011 | Copeland, III | |
| 7,890,627 B1 * | 2/2011 | Thomas | 709/224 |
| 7,895,326 B2 | 2/2011 | Jerrim et al. | |
| 7,913,306 B2 | 3/2011 | Apap et al. | |
| 7,930,353 B2 | 4/2011 | Chickering | |
| 7,962,798 B2 | 6/2011 | Locasto et al. | |
| 7,979,907 B2 | 7/2011 | Schultz et al. | |
| 7,996,288 B1 | 8/2011 | Stolfo | |
| 8,015,414 B2 * | 9/2011 | Mahone | G06F 21/55 713/189 |
| 8,019,764 B1 * | 9/2011 | Nucci et al. | 707/739 |
| 8,065,722 B2 | 11/2011 | Barford et al. | |
| 8,074,115 B2 | 12/2011 | Stolfo et al. | |
| 8,161,130 B2 | 4/2012 | Stokes | |
| 8,170,966 B1 | 5/2012 | Musat et al. | |
| 8,180,916 B1 | 5/2012 | Nucci et al. | |
| 8,200,761 B1 | 6/2012 | Tevanian | |
| 8,224,994 B1 | 7/2012 | Schneider | |
| 8,260,914 B1 * | 9/2012 | Ranjan | H04L 61/1511 709/224 |
| 8,341,745 B1 | 12/2012 | Chau | |
| 8,347,394 B1 | 1/2013 | Lee | |
| 8,402,543 B1 | 3/2013 | Ranjan et al. | |
| 8,418,249 B1 | 4/2013 | Nucci et al. | |
| 8,484,377 B1 | 7/2013 | Chen et al. | |
| 8,516,585 B2 | 8/2013 | Cao et al. | |
| 8,527,592 B2 | 9/2013 | Gabe | |
| 8,578,497 B2 | 11/2013 | Antonakakis et al. | |
| 8,631,489 B2 | 1/2014 | Antonakakis et al. | |
| 8,667,583 B2 | 3/2014 | Polyakov et al. | |
| 8,826,438 B2 | 9/2014 | Perdisci et al. | |
| 8,832,829 B2 | 9/2014 | Manni et al. | |
| 8,869,269 B1 * | 10/2014 | Ramzan | H04L 63/1483 709/206 |
| 9,306,969 B2 | 4/2016 | Dagon et al. | |
| 9,516,058 B2 | 12/2016 | Antonakakis et al. | |
| 9,525,699 B2 | 12/2016 | Antonakakis et al. | |
| 2001/0014093 A1 | 8/2001 | Yoda et al. | |
| 2001/0044785 A1 | 11/2001 | Stolfo et al. | |
| 2001/0052007 A1 | 12/2001 | Shigezumi | |
| 2001/0052016 A1 | 12/2001 | Skene et al. | |
| 2001/0055299 A1 | 12/2001 | Kelly | |
| 2002/0021703 A1 | 2/2002 | Tsuchiya et al. | |
| 2002/0066034 A1 | 5/2002 | Schlossberg et al. | |
| 2002/0166063 A1 | 11/2002 | Lachman et al. | |
| 2002/0178238 A1 | 11/2002 | Fletcher | |
| 2003/0065926 A1 | 4/2003 | Schultz et al. | |
| 2003/0065943 A1 | 4/2003 | Geis et al. | |
| 2003/0069992 A1 | 4/2003 | Ramig | |
| 2003/0145233 A1 | 7/2003 | Poletto et al. | |
| 2003/0167308 A1 * | 9/2003 | Schran | H04L 63/20 709/205 |
| 2003/0167402 A1 | 9/2003 | Stolfo et al. | |
| 2003/0204621 A1 | 10/2003 | Poletto et al. | |
| 2003/0236995 A1 | 12/2003 | Fretwell, Jr. | |
| 2004/0002903 A1 | 1/2004 | Stolfo et al. | |
| 2004/0039798 A1 | 2/2004 | Hotz et al. | |
| 2004/0044791 A1 | 3/2004 | Pouzzner | |
| 2004/0088346 A1 | 5/2004 | Yeager | |
| 2004/0088348 A1 | 5/2004 | Yeager | |
| 2004/0111636 A1 | 6/2004 | Baffes et al. | |
| 2004/0181687 A1 | 9/2004 | Nachenberg et al. | |
| 2004/0187032 A1 | 9/2004 | Gels et al. | |
| 2004/0205474 A1 | 10/2004 | Eskin et al. | |
| 2004/0215972 A1 | 10/2004 | Sung et al. | |
| 2005/0021848 A1 | 1/2005 | Jorgenson | |
| 2005/0036501 A1 | 2/2005 | Chung et al. | |
| 2005/0039019 A1 | 2/2005 | Delany | |
| 2005/0044406 A1 | 2/2005 | Stute | |
| 2005/0050377 A1 | 3/2005 | Chan et al. | |
| 2005/0060643 A1 | 3/2005 | Glass et al. | |
| 2005/0086523 A1 | 4/2005 | Zimmer et al. | |
| 2005/0108407 A1 | 5/2005 | Johnson et al. | |
| 2005/0108415 A1 | 5/2005 | Turk et al. | |
| 2005/0210534 A1 | 9/2005 | Krishnamurthy | |
| 2005/0257264 A1 | 11/2005 | Stolfo et al. | |
| 2005/0261943 A1 | 11/2005 | Quarterman et al. | |
| 2005/0265331 A1 | 12/2005 | Stolfo | |
| 2005/0278540 A1 | 12/2005 | Cho | |
| 2005/0281291 A1 | 12/2005 | Stolfo et al. | |
| 2006/0015630 A1 | 1/2006 | Stolfo et al. | |
| 2006/0015722 A1 * | 1/2006 | Rowan | H04L 63/0823 713/166 |
| 2006/0026682 A1 | 2/2006 | Zakas | |
| 2006/0031483 A1 | 2/2006 | Lund | |
| 2006/0067240 A1 | 3/2006 | Kim et al. | |
| 2006/0068806 A1 | 3/2006 | Nam | |
| 2006/0075084 A1 | 4/2006 | Lyon | |
| 2006/0075494 A1 * | 4/2006 | Bertman | G06F 21/552 726/22 |
| 2006/0078096 A1 | 4/2006 | Poyhonen | |
| 2006/0143711 A1 | 6/2006 | Huang et al. | |
| 2006/0146816 A1 | 7/2006 | Jain | |
| 2006/0150249 A1 | 7/2006 | Gassen et al. | |
| 2006/0156402 A1 | 7/2006 | Stone et al. | |
| 2006/0168024 A1 * | 7/2006 | Mehr et al. | 709/206 |
| 2006/0174345 A1 | 8/2006 | Flanagan et al. | |
| 2006/0176822 A1 | 8/2006 | Doyle et al. | |
| 2006/0178994 A1 | 8/2006 | Stolfo et al. | |
| 2006/0200539 A1 | 9/2006 | Kappler | |
| 2006/0212925 A1 * | 9/2006 | Shull et al. | 726/1 |
| 2006/0212942 A1 | 9/2006 | Barford et al. | |
| 2006/0224677 A1 | 10/2006 | Ishikawa et al. | |
| 2006/0230039 A1 * | 10/2006 | Shull et al. | 707/6 |

(56) References Cited

U.S. PATENT DOCUMENTS

| | | |
|---|---|---|
| 2006/0247982 A1 | 11/2006 | Stolfo et al. |
| 2006/0253581 A1 | 11/2006 | Dixon |
| 2006/0253584 A1* | 11/2006 | Dixon et al. .............. 709/225 |
| 2006/0259967 A1 | 11/2006 | Thomas et al. |
| 2006/0265436 A1 | 11/2006 | Edmond |
| 2006/0288415 A1 | 12/2006 | Wong |
| 2007/0050708 A1 | 3/2007 | Gupta et al. |
| 2007/0056038 A1 | 3/2007 | Lok |
| 2007/0064617 A1* | 3/2007 | Reves ............ H04L 63/1425 370/252 |
| 2007/0076606 A1 | 4/2007 | Olesinski |
| 2007/0083931 A1 | 4/2007 | Spiegel |
| 2007/0118669 A1 | 5/2007 | Rand |
| 2007/0136455 A1 | 6/2007 | Lee et al. |
| 2007/0162587 A1 | 7/2007 | Lund et al. |
| 2007/0198679 A1 | 8/2007 | Duyanovich et al. |
| 2007/0209074 A1 | 9/2007 | Coffman |
| 2007/0239999 A1 | 10/2007 | Honig et al. |
| 2007/0253377 A1 | 11/2007 | Janneteau et al. |
| 2007/0274312 A1 | 11/2007 | Salmela et al. |
| 2007/0294339 A1 | 12/2007 | Ala-Kleemola et al. |
| 2007/0294419 A1 | 12/2007 | Ulevitch |
| 2008/0005555 A1 | 1/2008 | Lotem et al. |
| 2008/0016570 A1 | 1/2008 | Capalik |
| 2008/0028073 A1 | 1/2008 | Trabe et al. |
| 2008/0028463 A1* | 1/2008 | Dagon et al. ............. 726/22 |
| 2008/0060054 A1 | 3/2008 | Srivastava |
| 2008/0060071 A1 | 3/2008 | Hennan et al. |
| 2008/0098476 A1 | 4/2008 | Syversen |
| 2008/0133300 A1 | 6/2008 | Jalinous |
| 2008/0155694 A1 | 6/2008 | Kwon et al. |
| 2008/0177736 A1 | 7/2008 | Spangler |
| 2008/0177755 A1 | 7/2008 | Stern et al. |
| 2008/0178293 A1 | 7/2008 | Keen et al. |
| 2008/0184371 A1 | 7/2008 | Moskovitch |
| 2008/0195369 A1 | 8/2008 | Duyanovich et al. |
| 2008/0201779 A1 | 8/2008 | Tahan et al. |
| 2008/0222729 A1 | 9/2008 | Chen et al. |
| 2008/0229415 A1 | 9/2008 | Kapoor |
| 2008/0262985 A1 | 10/2008 | Cretu et al. |
| 2008/0263659 A1 | 10/2008 | Alme |
| 2008/0276111 A1 | 11/2008 | Jacoby et al. |
| 2009/0055929 A1 | 2/2009 | Lee et al. |
| 2009/0083855 A1 | 3/2009 | Apap et al. |
| 2009/0106304 A1 | 4/2009 | Song |
| 2009/0138590 A1 | 5/2009 | Lee et al. |
| 2009/0171871 A1 | 7/2009 | Zhang et al. |
| 2009/0193293 A1 | 7/2009 | Stolfo et al. |
| 2009/0193497 A1 | 7/2009 | Kikuchi et al. |
| 2009/0198997 A1 | 8/2009 | Yeap |
| 2009/0210417 A1 | 8/2009 | Bennett |
| 2009/0222922 A1 | 9/2009 | Sidiroglou et al. |
| 2009/0241190 A1 | 9/2009 | Todd et al. |
| 2009/0241191 A1 | 9/2009 | Keromytis et al. |
| 2009/0254658 A1 | 10/2009 | Kamikura et al. |
| 2009/0254989 A1 | 10/2009 | Achan et al. |
| 2009/0254992 A1 | 10/2009 | Schultz et al. |
| 2009/0265777 A1 | 10/2009 | Scott |
| 2009/0282479 A1 | 11/2009 | Smith et al. |
| 2009/0327487 A1 | 12/2009 | Olson et al. |
| 2010/0011243 A1 | 1/2010 | Locasto et al. |
| 2010/0011420 A1 | 1/2010 | Drako |
| 2010/0017487 A1 | 1/2010 | Patinkin |
| 2010/0023810 A1 | 1/2010 | Stolfo et al. |
| 2010/0031358 A1 | 2/2010 | Elovici et al. |
| 2010/0034109 A1 | 2/2010 | Shomura et al. |
| 2010/0043047 A1 | 2/2010 | Archer et al. |
| 2010/0054278 A1 | 3/2010 | Stolfo et al. |
| 2010/0064368 A1 | 3/2010 | Stolfo et al. |
| 2010/0064369 A1 | 3/2010 | Stolfo et al. |
| 2010/0071068 A1 | 3/2010 | Bauschert et al. |
| 2010/0074112 A1 | 3/2010 | Derr et al. |
| 2010/0077481 A1 | 3/2010 | Polyakov et al. |
| 2010/0077483 A1 | 3/2010 | Stolfo et al. |
| 2010/0082758 A1 | 4/2010 | Golan |
| 2010/0138919 A1 | 6/2010 | Peng |
| 2010/0146615 A1 | 6/2010 | Locasto et al. |
| 2010/0153785 A1 | 6/2010 | Keromytis et al. |
| 2010/0169970 A1 | 7/2010 | Stolfo et al. |
| 2010/0235915 A1 | 9/2010 | Memon et al. |
| 2010/0269175 A1 | 10/2010 | Stolfo et al. |
| 2010/0274970 A1 | 10/2010 | Treuhaft et al. |
| 2010/0275263 A1 | 10/2010 | Bennett et al. |
| 2010/0281539 A1 | 11/2010 | Burns et al. |
| 2010/0281541 A1 | 11/2010 | Stolfo et al. |
| 2010/0281542 A1 | 11/2010 | Stolfo et al. |
| 2010/0319069 A1 | 12/2010 | Granstedt |
| 2010/0332680 A1 | 12/2010 | Anderson et al. |
| 2011/0040706 A1 | 2/2011 | Sen et al. |
| 2011/0041179 A1 | 2/2011 | Stahlberg |
| 2011/0055123 A1 | 3/2011 | Kennedy |
| 2011/0067106 A1 | 3/2011 | Evans et al. |
| 2011/0167493 A1 | 7/2011 | Song et al. |
| 2011/0167494 A1 | 7/2011 | Bowen et al. |
| 2011/0185423 A1 | 7/2011 | Sallam |
| 2011/0185428 A1 | 7/2011 | Sallam |
| 2011/0214161 A1 | 9/2011 | Stolfo et al. |
| 2011/0225644 A1 | 9/2011 | Pullikottil et al. |
| 2011/0283361 A1 | 11/2011 | Perdisci et al. |
| 2012/0079101 A1 | 3/2012 | Muppala et al. |
| 2012/0084860 A1 | 4/2012 | Cao et al. |
| 2012/0102568 A1 | 4/2012 | Tarbotton et al. |
| 2012/0117641 A1 | 5/2012 | Holloway |
| 2012/0143650 A1 | 6/2012 | Crowley et al. |
| 2012/0151585 A1 | 6/2012 | Lamastra et al. |
| 2012/0198549 A1 | 8/2012 | Antonakakis et al. |
| 2012/0215909 A1 | 8/2012 | Goldfarb et al. |
| 2013/0054802 A1 | 2/2013 | Donzis et al. |
| 2013/0174253 A1 | 7/2013 | Thomas et al. |
| 2013/0191915 A1 | 7/2013 | Antonakakis et al. |
| 2013/0232574 A1 | 9/2013 | Carothers |
| 2014/0059216 A1 | 2/2014 | Jerrim |
| 2014/0068763 A1 | 3/2014 | Ward et al. |
| 2014/0068775 A1 | 3/2014 | Ward et al. |
| 2014/0074838 A1 | 3/2014 | Akoglu et al. |
| 2014/0075558 A1 | 3/2014 | Ward et al. |
| 2014/0090058 A1 | 3/2014 | Ward et al. |
| 2014/0157414 A1 | 6/2014 | Antonakakis et al. |
| 2014/0289854 A1 | 9/2014 | Mahvi |
| 2014/0101759 A1 | 12/2014 | Nelms et al. |
| 2014/0373148 A1 | 12/2014 | Nelms et al. |
| 2015/0026808 A1 | 1/2015 | Perdisci et al. |
| 2015/0222654 A1 | 8/2015 | Crowley et al. |
| 2016/0156660 A1 | 6/2016 | Dagon et al. |
| 2016/0285894 A1 | 9/2016 | Nelms et al. |

OTHER PUBLICATIONS

Niel Landwehr et al., "Logistic Model Trees", Machine Learning, vol. 59, pp. 161-205 (2005).

Richard O. Duda et al., "Pattern Classification, Second Edition", John Wiley & Sons, Inc., pp. vii-xx, and 1-654, Copyright 2001.

Cliff Changchun Zou et al., "Code Red Worm Propagation Modeling and Analysis", In Proceedings of 9th ACM Conference on Computer and Communications Security (CCS '02), Oct. 2002.

Cliff C. Zou et al,. "Email Worm Modeling and Defense", In the 13th ACM International Confrerence on Computer Communications and Networks (CCCN '04), Oct. 2004.

Cliff Changchun Zou et al., "Monitoring and Early Warning for Internet Worms", In Proceedings fo the 10th ACM Conference on Computer and Communications Security (CCS '03), Oct. 2003.

Cliff Changchun Zou et al., "On the Performance of Internet Worm Scanning Strategies", Technical Report TR-03-CSE-07, Umass ECE Dept., Nov. 2003.

Alexander Gostev, "Malware Elovution: Jan.- Mar. 2005", Viruslist. com, http.//www.viruslist.com/en/analysis?pubid=162454316, (Mar. 2005).

Jiang Wu et al., "An Effective Architecture and Algorithm for Detecting Worms with Various Scan Techniques", In Proceedings of the 11th Annual Network and Distributed System Security Symposium (NDSS '04), Feb. 2004.

(56) References Cited

OTHER PUBLICATIONS

Matthew M. Williamson et al., "Virus Throttling for Instant Messaging", Virus Bulletin Conference, Sep. 2004, Chicago, IL, USA, (Sep. 2004).
F. Weimer, "Passive DNS Replication", http://www.enyo.de/fw/software/dnslogger, 2005.
Ke Wang et al., "Anomalous Payload-Based Network Intrusion Detection", In Proceedings of the 7th International Symposium on Recent Advances in Intrusion Detection (RAID 2004), 2004.
P. Vixie et al., "RFC 2136: Dynamic Updates in the Domain Name System (DNS Update)", http://www.faqs.org/rfcs.rfc2136.html (Apr. 1997).
Joe Stewart, "Dipnet/Oddbob Worm Analysis", SecureWorks, http://www.secureworks.com/research/threats/dipnet/ (Jan. 13, 2005).
Harold Thimbleby et al., "A Framework for Modeling Trojans and Computer Virus Infection", Computer Journal, vol. 41, No. 7, pp. 444-458 (1999).
Paul Bachner et al., "Know Your Enemy: Tracking Botnets", http://www.honeynet.org/papers/bots/, (Mar. 13, 2005).
"LockDown Security Bulletin—Sep. 23, 2001", http://lockdowncorp.com/bots/ (Sep. 23, 2001).
Colleen Shannon et al., "The Spread of the Witty Worm", http://www.caida.org/analysis/security/witty/index.xml (Mar. 19, 2004).
Moheeb Abu Rajab et al., "On the Effectiveness of Distributed Worm Monitoring", In Proceedings fo the 14th USENIX Security Symposium (2005).
Niels Provos, "CITI Technical Report 03-1: A Virtual Honeypot Framework", http://www.citi.umich.edu/techreports/reports/citi-tr-03-1.pdf (Oct. 21, 2003).
"Know your Enemy: Honeynets", http://www.honeypot.org/papers/honeynet, (May 31, 2006).
David Moore et al., "Internet Quarantine: Requirements for Containing Self-Propagating Code", In Proceedings of the IEEE INFOCOM 2003, Mar. 2003.
Joe Stewart, "I-Worm Baba Analysis", http://secureworks.com/research/threats/baba (Oct. 22, 2004.
David Moore et al., "Slammer Worm Dissection: Inside the Slammer Worm", IEEE Security & Privacy, vol. 1, No. 4 (Jul.-Aug. 2003).
David Moore et al., "Code-Red: A Case Study on the Spread and Victims of an Internet Worm", http://www.icir.org/vern/imw-2002/imw2002-papers/209.ps/gz (2002).
Joe Stewart,"Sinit P2P Trojan Analysis", http://www.secureworks.com/research/threats/sinit, (Dec. 8, 2003).
Martin Krzywinski, "Port Knocking—Network Authentication Across Closed Ports", Sys Admin Magazine, vol. 12, pp. 12-17 (2003).
Christopher Kruegel et al., "Anomaly Detection of Web-Based Attacks", In Proceedings of the 10th ACM Conference on Computer and Communication Security (CCS '03), Oct. 27-31, 2003, Washington, DC, USA, pp. 251-261.
"Dabber Worm Analysis", LURHQ Threat Intelligence Group, http://www.lurhq.com/dabber.html (May 13, 2004).
Abstract of Jeffrey O. Kephart et al,. "Directed-Graph Epidemiological Models of Computer Viruses", Proceedings of the 1991 IEEE Computer Society Symposium on Research in Security and Privacy; Oakland, CA, May 20-22, 1991; pp. 343-359 (May 20-22, 1991).
C. Kalt "RFC 2810—Internet Relay Chat: Architecture" http://faqs.org/rfcs/rfc2810.html (Apr. 2000).
Xuxian Jiang et al., "Cerias Tech Report 2005-24: Virtual Playgrounds for Worm Behavior Investigation", Purdue University, Feb. 2005.
Neal Hindocha et al., "Malicious Threats and Vulnerabilities in Instant Messaging", Virus Bulletin International Conference, Sep. 2003.
"NSTX (IP-over-DNS) HOWTO", http://thomer.com/howtos/nstx.html (Nov. 4, 2005).
V. Fuller et al., "RFC 1519—Classless Inter-Domain Routing (CIDR): An Address Assignment and Aggregation Strategy", http://www.faqs.org/rfcs/rfc1519.html (Sep. 1993).
David E. Smith "Dynamic DNS", http://www.technopagan.org/dynamic (Aug. 7, 2006).
Dave Dittrich, "Active Response Continuum Research Project", http://staff.washington.edu/dittrich/arc/ (Nov. 14, 2005).
Joe Stewart, "Akak Trojan Analysis", http://www.secureworks.com/research/threats/akak/ (Aug. 31, 2004).
Monirul I. Sharif, "Mechanisms of Dynamic Analysis and DSTRACE".
Kapil Kumar Singh, "IRC Reconnaissance (IRCRecon) Public IRC Heuristics (BotSniffer)" (Jul. 24, 2006).
http://www.trendmicro.com/en/home/us/home.htm.
"InterCloud Security Service", http://ww.trendmicro.com/en/products/nss/icss/evaluate/overview.thm.
"2006 Press Releases: Trend Micro Takes Unprecedented Approach to Eliminating Botnet Threats with the Unveiling of InterCloud Security Service", http://www.trendmicro.com/en/about/news/pr/archive/2006/pr092506.htm, (Sep. 25, 2006).
Paul F. Roberts, "Trend Micro Launches Anti-Botnet Service", InfoWorld, http://www.infoworld.com/article/06/09/25/HNtrendintercloud_1.html (Sep. 25, 2006).
CNN Technology News—Expert: Botnets No. 1 Emerging Internet Threat, CNN.com, http://www.cnn.com/2006/TECH/internet/01/31/furst.index.html (Jan. 31, 2006).
Evan Cooke et al., "The Zombie Roundup: Understanding, Detecting, and Disrupting Botnets", In USENIX Workshop on Steps to Reducing Unwanted Traffic on the Internet (SRUTI), Jun. 2005.
Sven Dietrich et al., "Analyzing Distributed Denial of Service Tools: The Shaft Case", Proceedings of the 14th Systems Administration Conference (LISA 2000), New Orleans, Louisiana, USA, Dec. 3-8, 2000.
Felix C. Freiling et al,. "Botnet Tracking: Exploring a Root-Cause Methodology to Prevent Distributed Denial-of-Service Attacks", ESORICS 2005, LNCS 3679, pp. 319-335 (2005).
Luiz Henrique Gomes et al,. "Characterizing a Spam Traffic", In Proc. ACM SIGCOMM Internet Measurement Conference (IMC '04), Oct. 25-27, 2004 Taormina, Sicily, Italy, pp. 356-369.
Christopher W. Hanna, "Using Snort to Detect Rogue IRC Bot Programs", Technical Report, SANS Institute 2004 (Oct. 8, 2004).
Jaeyeon Jung et al., "An Empirical Study of Spam Traffic and the Use of DNS Black Lists", In Proc. ACM SIGCOMM Internet Measurement Conference (IMC '04), Oct. 25-27, 2004, Taormina, Sicily, Italy, pp. 370-375.
Srikanth Kandula et al., "Botz-4-Sale: Surviving Organized DDoS Attacks That Mimic Flash Crowds", Technical Report LCS TR-969, Laboratory for Computer Science, MIT, 2004.
Sven Krasser et al., "Real-Time and Forensic Network Data Analysis Using Animated and Coordinated Visualization", Proceedings of the 6th IEEE Information Assurance Workshop (Jun. 2005).
David Moore et al., "Inferring Internet Denial-of-Service Activity", In Proceedings of the 2001 USENIX Security Symposium, 2001.
Stephane Racine, "Master's Thesis: Analysis for Internet Relay Chat Usage by DDoS Zombies", ftp://www.tik.ee.ethz.ch/pub/students/2003-2004-Wi/MA-2004-01.pdf (Nov. 3, 2003).
Anirudh Ramachandran et al., "Understanding the Network-Level Behavior of Spammers", SIGCOMM '06, Sep. 11-15, 2006, Pisa, Italy, pp. 291-302.
Ramneek Puri, "Bots & Botnet: An Overview", SANS Institute 2003, http://www.giac.com/practical/GSEC/Ramneek_Puri_GSEC.pdf (Aug. 8, 2003).
Stuart E. Schechter et al., "Access for Sale: A New Class of Worm", In 2003 ACM Workshop on Rapid Malcode (WORM '03), ACM SIGSAC, Oct. 27, 2003, Washington, DC, USA.
Stuart Staniford, "How to Own the Internet in Your Spare Time", In Proc. 11th USENIX Security Symposium, San Francisco, CA, Aug. 2002.
Martin Overton, "Bots and Botnets: Risks, Issues and Prevention", 2005 Virus Bulletin Conference at the Burlington, Dublin, Ireland, Oct. 5-7, 2005, http://arachnid.homeip.net/papers/VB2005-Bots_and_Botnets-1.0.2.pdf.

(56) References Cited

OTHER PUBLICATIONS

Yin Zhang et al., "Detecting Stepping Stones", Proceedings of the 9th USENIX Security Symposium, Denver, Colorado, USA, Aug. 14-17, 2000.
Joe Stewart, "Bobax Trojan Analysis", http://www.lurhq.com/bobax.html, May 17, 2004.
David Brumley et al., "Tracking Hackers on IRC", http://www.doomded.com/texts/ircmirc/TrackingHackersonIRC.htm, Dec. 8, 1999.
Brian Krebs, "Bringing Botnets Out of the Shadows", Washingtonpost.com, http://www.washingtonpost.com/wp-dyn/content/artcile/2006/03/21/AR2006032100279_pf.html, Mar. 21, 2006.
"SwatIT: Bots, Drones, Zombies, Worms and Other Things That Go Bump in the Night", http://swatit.org/bots, 2004.
Christian Kreibich, "Honeycomb: Automated NIDS Signature Creation Using Honeypots", 2003, http://www.cl.cam.ac.uk/research/srg/netos/papers/2003-honeycomb-sigcomm-poster.pdf.
DMOZ Open Directory Project, Dynamic DNS Providers List, http://dmoz.org/Computers/Software/Internet/Servers/Address_Management/Dynamic_DNS_Services/, printer Aug. 8, 2007.
David Moore, "Network Telescopes: Observing Small or Distant Security Events", http://www.caida.org/publications/presentations/2002/usenix_sec/usenix_sec_2002_files/frame.htm; Aug. 8, 2002.
Vincent H. Berk et al., "Using Sensor Networks and Data Fusion for Early Detection of Active Worms", Sensors, and Command, Control, Communications, and Intelligence (C3iI) Technologies for Homeland Defense and Law Enforcement II, Proceedings of SPIE, vol. 5071, pp. 92-104 (2003).
David Dagon et al., "Worm Population Control Through Periodic Response", Technical Report, Georgia Institute for Technology, Jun. 2004.
Scott Jones et al., "The IPM Model of Computer Virus Management", Computers & Security, vol. 9, pp. 411-418 (1990).
Jeffrey O. Kephart et al., "Directed-Graph Epidemiological Models of Computer Viruses", In Proceedings of IEEE Symposium on Security and Privacy, pp. 343-359 (1991).
Darrell M. Kienzle et al., "Recent Worms: A Survey and Trends", In WORM '03, Proceedings of the 2003 ACM Workshop on Rapid Malcode, Washington, DC, USA, pp. 1-10, Oct. 27, 2003.
Bill McCarty, "Botnets: Big and Bigger", IEEE Security and Privacy Magazine, vol. 1, pp. 87-89 (2003).
Xinzhou Qin et al., "Worm Detection Using Local Networks", Technical Report GIT-CC-04-04, College of Computing, Georgia Institute of Technology, Feb. 2004.
Yang Wang et al., "Modeling the Effects of Timing Parameters on Virus Propagation", In Proceedings of ACM CCS Workshop on Rapid Malcode (WORM '03), Washington, DC, pp. 61-66, Oct. 27, 2003.
Donald J. Welch et al., "Strike Back: Offensive Actions in Information Warfare", in AMC New Security Paradigm Workshop, pp. 47-52 (1999).
T. Liston, "Welcome to my Tarpit: The Tactical and Stragetic Use of LaBrea", http://www.hackbusters.net/LaBrea/LaBrea.txt, Oct. 24, 2001.
R. Pointer, "Eggdrop Development", http://www.eggheads.org, Oct. 1, 2005.
S. Staniford, "Code Red Analysis Pages: July Infestation Analysis", http://silicondefense.org/cr/july.html, Nov. 18, 2001.
Alex Ma, "NetGeo—The Internet Geographic Database", http://www.caida.org/tools/utilities/netgeo/index.xml, Sep. 6, 2006.
MathWorks Inc. Simulink, http://www.mathworks.com/products/simulink, Dec. 31, 2005.
David Dagon et al., "Modeling Botnet Propagation Using Time Zones", In Proceedings of the 13th Annual Network and Distributed Systems Security Symposium (NDSS '06), Feb. 2006.
John Canavan, "Symantec Security Response: W32.Bobax.D", http://www.sarc.com/avcent/venc/data/w32.bobax.d.html, May 26, 2004.
"Whois Privacy", www.gnso.icann.org/issues/whois-privacy/index/shtml, Jun. 3, 2005.
John D. Hardin, "The Scanner Tarpit HOWTO", http://www.impsec.org/linus/security/scanner-tarpit.html, Jul. 20, 2002.
Charles J. Krebs, "Ecological Methodology", Harper & Row, Publishers, New York, pp. v-x, 15-37, 155-166, and 190-194 (1989).
D.J. Daley et al., "Epidemic Modeling: An Introduction", Cambridge University Press, pp. vii-ix, 7-15, and 27-38 (1999).
Lance Spitzner, "Honeypots: Tracking Hackers", Addison-Wesley, pp. vii-xiv, 73-139, 141-166, and 229-276 (2003).
International Search Report issued in Application No. PCT/US06/038611 dated Jul. 8, 2008.
Written Opinion issued in Application No. PCT/US06/038611 dated Jul. 8, 2008.
International Preliminary Report on Patentability issued in Application No. PCT/US06/038611 dated Mar. 26, 2009.
O. Diekmann et al,. "Mathematical Epidemiology of Infectious Diseases: Model Building, Analysis and Interpretation", John Wiley & Son, Ltd., 2000, pp. v-xv and 1-303.
Jelena Mirkovic et al,. "Internet Denial of Service: Attack and Defense Mechanisms", Prentice Hall Professional Technical Reference, 2004, pp. v-xxii and 1-372.
"Symantec Internet Security Threat Report: Trends for Jan. 1, 2004-Jun. 30, 2004" Symantec, Sep. 2004, pp. 1-54.
David Dagon et al., "HoneyStat: Local Worm Detection Using Honeypots", RAID 2004; LNCS 3224, pp. 39-58 (2004).
Jonghyun Kim et al., "Measurement and Analysis of Worm Propagation on Internet Network Topology", IEEE, pp. 495-500 (2004).
Andreas Marx, "Outbreak Response Times: Putting AV to the Test", www.virusbtn.com, Feb. 2004, pp. 4-6.
Vinod Yegneswaran et al., "Global Intrusion Detection in the DOMINO Overlay System", Proceedings of Network and Distributed Security Symposium (NDSS), 17 pages Feb. 2004.
Vinod Yegneswaran et al., "On the Design and Use of Internet Sinks for Network Abuse Monitoring", RAID 2004, LNCS 3224, pp. 146-165 (2004).
Cliff Changchun Zou et al., "Worm Propagation Modeling and Analysis Under Dynamic Quarantine Defense", WORM'03, Oct. 27, 2003, Washington, DC USA, 10 pages.
Cliff C. Zou et al., "Routing Worm; A Fast; Selective Attack Worm Based on IP Address Information", Technical Report: TR-03-CSE-06, Principles of Advanced and Distributed Simulation (PADS) 2005, pp. 199-206, Jun. 1-3, 2005.
Thorsten Holz, "Anti-Honeypot Technology", 21st Chaos Communication Congress, slides 1-57, Dec. 2004.
"CipherTrust's Zombie Stats", http://www.ciphertrust.com/resources/statistics/zombie.php 3 pages, printed Mar. 25, 2009.
Joe Stewart, "Phatbot Trojan Analysis", http://www.secureworks.com/research/threats/phatbot, Mar. 15, 2004, 3 pages.
Thorsten Holz et al., "A Short Visit to the Bot Zoo", IEEE Security & Privacy, pp. 7679 (2005).
Michael Glenn, "A Summary of DoS/DDoS Prevention, Monitoring and Mitigation Techniques in a Service Provider Environment", SANS Institute 2003; Aug. 21, 2003, pp. ii-iv, and 1-30.
Dennis Fisher, "Thwarting the Zombies", Mar. 31, 2003, 2 pages.
Felix C. Freiling et al., "Botnet Tracking: Exploring a Root-Cause Methodology to Prevent Distributed Denial-of-Service Attacks", ESORICS 2005, LNCS 3679, pp. 319-335 (2005).
Office Action issued in U.S. Appl. No. 11/538,212, dated Oct. 29, 2009.
Dongeun Kim et al., "Request Rate Adaptive Dispatching Architecture for Scalable Internet Server", Proceedings of the IEEE International Conference on Cluster Computing (CLUSTER'00); pp. 289-296 (2000).
Keisuke Ishibashi et al., "Detecting Mass-Mailing Worm Infected Hosts by Mining DNS Traffic Data", SIGCOMM'05 Workshops, pp. 159-164 (Aug. 22-26, 2005).
Nicholas Weaver et al., "A Taxonomy of Computer Worms", WORM'03, pp. 11-18 (Oct. 27, 2003).
Fiie History of U.S. Appl. No. 12/985,140.
Guofei Gu et al. "BotMiner: Clustering Analysis of Network Traffic Protocol- and Structure-Independent Botnet Detection", 2008, USENIX Security Symposium, pp. 139-154.

(56) References Cited

OTHER PUBLICATIONS

Zhu et al., "Using Failure Information Analysis to Detect Enterprise Zombies," Lecture note of the Institute for Computer Science, Social-Informatics and Telecommunications Engineering, vol. 19, part 4, pp. 185-206, 2009.
"Virus:Win32/Expiro.Z". http://www.microsoft.com/security/portal/Threat/Encyclopedia/Entry.aspx, Jun. 9, 2011 (5pages).
P. Mockapetris, "Domain Names—Concepts and Facilities", Network Working Group, http://www.ietf.org/rfc/rfc1034.txt, Nov. 1987 (52 pages).
P. Mockapetris, "Domain Names—Implementation and Specification", Network Working Group, http://www,ietf.org/rfc/rfc1035.txt, Nov. 1987 (52 pages).
Philip Porras et al. "SRI International Technical Report: An Analysis of Conficker's Logic and Rendezvous Points", http://mtc.sri.com/Conficker/, Mar. 19, 2009, (31 pages).
Phillip Porras et al. "SRI International Technical Report: Conficker C Analysis", http://mtc.sri.com/Conficker/addendumC, Apr. 4, 2009, (24 pages).
Paul Royal, Dambella, "Analysis of the Kracken Botnet", Apr. 9, 2003 (13 pages).
Sergei Shevchenko, "Srizbi's Domain Calculator", http://blog.threatexpert.com/2008/11/srizbix-domain-calculator.html, Nov. 28, 2008 (3 pages).
P Akritidis et al., "Efficient Content-Based Detection of Zero-Day Worms", 2005 IEEE International Conference in communications, vol. 2, pp. 837-843, May 2005.
M. Patrick Collins et al., "Hit-List Worm Detection and Bot Identification in Large Networks Using Protocol Graphs", RAID 2007, LNCS 4637, pp. 276-295 (2007).
Nicholas Weaver et al., "Very Fast Containment of Scanning Worms", In proceedings of the 13th USENIX Security Symposium, pp. 29-44, Aug. 9-13, 2004.
David Whyte et al., "DNS-Based Detection of Scanning Worms in an Enterprise Network", In Proc. of the 12th Annual Network and Distributed System Security Symposium, pp. 181-195, Feb. 3-4, 2005.
Cristian Abad et al., "Log Correlation for Intrusion Detection: A Proof of Concept", In Proceedings of the 19th Annual Computer Security Application Conference (ACSAC'03), (11 pages) (2003).
Lala A. Adamic et el., "Zipf's Law and the Internet", Glottometrics, vol. 3, pp. 143-150 (2002).
K.G. Anagnostakis et al., "Detecting Targeted Attacks Using Shadow Honeypots", In Proceedings of the 14th USENX Secuirty Symposium, pp. 129-144 (2005).
Paul Baecher et al., "The Nepenthes Platform: An Efficient Approach to Collect Malware", In Proceedings of Recent Advances in Intrusion Detection (RAID 2006), LNCS 4219, pp. 165-184, Sep. 2006.
Paul Barford et al., "An Inside Look at Botnets", Special Workshop on Malware Detection, Advances in Information Security, Spring Verlag, pp. 171-192 (2006).
James R. Binkley et al., "An Algorithm for Anomaly-Based Botnet Detection", 2nd Workshop on Steps to Reducing Unwanted Traffic on the Internet (SRUTI '06), pp. 43-48, Jul. 7, 2006.
Steven Cheung et al., "Modeling Multistep Cyber Attacks for Scenario Recognition", In Proceedings of the Third DARPA Information Survivability Conference and Exposition (DISCEX III), vol. 1, pp. 284-292, Apr. 22-24, 2003.
Evan Cooke et al., "The Zombie Roundup: Understanding, Detecting, and Disrupting Botnets", Steps to Reducing Unwanted Traffic on the Internet Workshop (SRUTI '05), pp. 39-44, Jul. 7, 2005.
Frederic Cuppens et al., "Alert Correlation in a Cooperative intrusion Detection Framework", In Proceedings of IEEE Symposium on Security and Privacy 2002, pp. 202-215 (2002).
David Degon et al., "Modeling Botnet Propagation using Time Zones", The 13th Annual Network and Distributed System Security Symposium 2006, Feb. 2-3, 2006 (18 pages).

Roger Dingledine et al., "Tor: The Second-Generation Onion Router", In Proceedings of the 13th Usenix Security Symposium, pp. 303-320 Aug. 9-13, 2004.
Steven T. Eckman et al., "STATL: An Attack Language for State-Based Intrusion Detection", Journal of Computer Security, vol. 10, pp. 71-103 (2002).
Daniel R. Ellis, et al, "A Behavioral Approach to Worm Detection", WORM'04, Oct. 29, 2004 (11 pages).
Prahlad Fogla et al., "Polymorphic Blending Attacks", In Proceedings of 15th Usenix Security Symposium, pp. 241-256, (2006).
Jan Goebel, "Rishi: Identify Bot Contaminated Hosts by IRC Nickname Evaluation", Hot Bots'07, Apr. 10, 2007 (14 pages).
Koral Ilgun et al., "State transition Analysis: A Rule-Based Intrusion Detection Approach", IEEE Transactions on Software Engineering, vol. 21, No. 3, pp. 181-199, Mar. 1995.
Xuxian Jiang et al., "Profiling Self-Propagating Worms Via Behavioral Footprinting", WORM'06, Nov. 3, 2006 (7 pages).
Giovanni Vigna et al., "NetSTAT: A Network-based intrusion Detection Approach", In Proceedings of the 14th Annual Computer Security Applications Conference (ACSAC '98), pp. 25-34, Dec. 7-11, 1998.
Kelly Jackson Higgins, "Shadowserver to Build 'Sinkhole' Server to Find Errant Bots: new Initiative Will Emulate IRC, HTTP Botnet Traffic", http://darkreading.com/taxonomy/index/printarticle/id/211201241. Sep. 24, 2008 (2 pages).
Kelly Jackson Higgins, "Hacking a New DNS Attack: DNS Expert Disputes Georgia Tach and Google Research That Points to Malicious Deployment of Certain Types of DNS Servers", http://darkreading.com/taxonomy/index/printarticle/id/208803784. Dec. 18, 2007 (2 pages).
Christian Kreibich, "Honeycomb: Automated Signature Creation Using Honeypots", http://www.icir.org/christain/honeycomb/index.html, Mar. 26, 2007, (3 pages).
Artem Dinaburg et al., "Ether: Malware Analysis Via Hardware Virtualization Extensions", CCS'08, Oct. 27-31, 2008 (12 pages).
Paul Royal, "Alternative Medicine: The Malware Analyst's Blue Pill", Black Hat USA 2008, Aug. 6, 2008 (33 pages).
Paul Royal, "Alternative Medicine: The Malware Analyst's Blue Pill", www.damballa.com/downloads/r_pubs/KrakenWhitepaper.pdf (2008) (3pages).
Christopher Kruegel et al., "Polymorphic Worm Detection using Structural Information of Executables", RAID 2005, pp. 207-226 (2005).
Paul Vixie, "DNS Complexity", ACM Queue, pp. 24-29, Apr. 2007.
Ke Wang et al., "Anagram: A Content Anomaly Detector Resistant to Mimicry Attack", In Proceedings of the International Symposium on Recent Advances in Intrusion Detection (RAID) (2006) (20 pages).
Ke Wang et al., "Anomalous Payload-Based Worm Detection and Signature Generation", In Proceedings of the International Symposium on Recent Advances in Intrusion Detection (RAID) (2005) (20 pages).
David Whyte, "Exposure Maps: Removing Reliance on Attribution During Scan Detection", 1st Usenix Workshop on Hot Topics in Security, pp. 51-55 (2006).
Jiahai Yang et al., "CARDS: A Distributed System for Detecting Coordinated Attacks", In Sec (2000) (10 pages).
Vinod Yegneswaran et al., "Using Honeynets for Internet Situational Awareness", In proceedings of the Fourth Workshop on Hot Topics in Networks (HotNets IV), Nov. 2005 (6 pages).
David Dagon et al., "Corrupted DNS Resolution Paths: The Rise of a Malicious Resolution Authority", In Proceedings of Network and Distributed Security Symposium (NDSS '08) (2008) (15 pages).
Dihe's IP-Index Browser, http://ipindex.homelinux.net/indek.php, updated Oct. 13, 2012 (1 page).
Thorsten Holz et al., "Measuring and Detecting Fast-Flux Service Networks", In Proceedings of NDSS (2008) (12 pages).
Jaeyeon Jung et al., "DNS Performance and the Effectiveness of Caching", IEEE/ACM Transactions on Networking, vol. 10, No. 5, pp, 589-603, Oct. 2002.
The Honeynet Project & Research Alliance, "Know Your Enemy: Fast-Flux Service Networks: An Ever Changing Enemy", http://old.honeynet.org/papers/ff/fast-flux.html, Jul. 13, 2007 (10 pages).

(56) References Cited

OTHER PUBLICATIONS

Duane Wessels et al., "Measurements and Laboratory Simulations of the Upper DNS Hierarchy", In PAM (2005) (10 pages).
Joe Stewart, "Top Spam Botnets Exposed", http://www.secureworks.com/cyber-threat-intelligence/threats/topbotnets/, Apr. 8, 2008 (11 pages).
Brett Stone-Gross et al., "Your Botnet is My Botnet: Analysis of a Botnet Takeover", CCS'09, Nov. 9-13, 2009 (13 pages).
Sam Stover et al., "Analysis of the Storm and Nugache Trojans: P2P is here", Login, vol. 32, No. 6, pp. 18-27, Dec. 2007.
"Storm Botnet", http://en.wikipedia.org/wiki/Storm_botnet, Printed Jan. 29, 2013 (7 pages).
Julia Wolf, "Technical Details of Srizbi's Domain Generation Algorithm", http://blog.fireeye.com/research/2008/11/technical-details-of-srizbis-domain-generation-algorithm.html, Nov. 25, 2008 (4 pages).
Paul Becher et al., "Know Your Enemy: Tracking Botnets: Using Honeynets to Learn More About Bots", http://www.honeynet.org/papers/bots, Aug. 10, 2008 (1 page).
Michael Bailey et al., "Automated Classification and Analysis of Internet Maiware", RAID 2007, ENCS 4637, pp. 178-197 (2007).
Paul Barham et al., "Xen and the Art of Virtualization", SOSP'03, Oct. 19-22, 2003 (14 pages).
Ulrich Bayer et al., "TTAnalyze: A Tool for Analyzing Malware", In Proceedings of the 15th Annual Conference European Institute for Computer Antivirus Research (EICAR), pp. 180-192 (2006).
Fabrice Beliard, "QEMU, A Fast and Portable Dynamic Translator", In Proceedings of the Annual Confernce on Usenix Annual Technical Conference, pp. 41-46 (2005).
Kevin Borders et al., "Siren: Catching Evasive Malware (Short Paper)", IEEE Symposium on Security and Privacy, pp. 78-85, May 21-24, 2006.
Christopher M. Bishop, Pattern Recognition and Machine Learning (Information Science and Statistics), Springer-Verlag New York, Inc., Secauscus, NJ, USA, 2006.
Ronen Feldman et al., "The Text Mining Handbook: Advance Approaches in Analyzing Unstructured Data", Cambridge Univ. Pr., 2007.
Matt Bishop, "Computer Security: Art and Science", Addison-Wesley Professional, 2003.
Neils Provos et al., "Virtual Honeypots: Form Botnet Tracking to Intrusion Detection", Addison-Wesley Professional, Reading, 2007.
Michael Sipser, "Introduction to the Theory of Computation", International Thomson Publishing, 1996.
Peter Szor, "The Art of Computer Virus Research and Defense", Addison-Wesley Professional, 2005.
Anil K. Jain et al., "Algorithms for Clustering Data", Prentice-Hall, Inc., 1988.
V. Laurikari, "TRE", 2006 (5 pages).
P. Porras, "Inside Risks: Reflections on Conficker" Communications of the ACM, vol. 52, No. 10, pp. 23-24, Oct. 2009.
Changda Wang et al., "The Dilemma of Covert Channels Searching" ICISC 2005, LNCS 3935, pp. 169-174, 2006.
C. Willems et al., "Toward Automated Dynamic Malware Analysis Using CWSandbox", IEEE Security and Privacy, vol. 5, No. 2, pp. 32-39, 2007.
R Developmental Core Team, "R: A Language and Environment for statistical Computing", R. Foundation for Statistical Computing, Vienna Austria, 2008.
Juan Caballero et al., "Polyglot: Automatic Extraction of Protocol Message Format Using Dynamic Binary Analysis", In Proceedings of ACM Conference on Computer and Communication Security, Oct. 2007 (15 pages).
Mihai Christodorescu et al., "Semantics-Aware Malware Detection", In Proceeding of the 2005 IEEE Symposium on Security and Privacy, pp. 32-46 (2005).
Mihai Christodorescu et al., "Mining Specifications on Malicious Behavior", ESEC/FSE'07, Sep. 3-7, 2007 (10 pages).
Peter Ferrie, "Attacks on Virtual Machine Emulators", Symantec Advance Threat Research, 2006 (13 pages).

Peter Ferrie, "Attacks on More Virtual Machine Emulators", Symantec Advance Threat Research, http://pferrie.tripod.com/papers/attacks2.pdf, 2007 (17 pages).
Tal Garfinkel et al., "A Virtual Machine Introspection Based Architecture for Intrusion Detection", In Proceedings of Network and Distributed Systems Security Symposium, Feb. 2003 (16 pages).
G. Hunt et ai., "Detours: Binary Interception of WIN32 Functions", Proceedings of the 3rd Usenix Windows NT Symposium, Jul. 12-13, 1999 (9 pages).
Xuxian Jiang et al., "Stealthy Malware Detection Through VMM-Based "Out-of-the-Box" Semantic View Reconstruction", CCS'07, Oct. 29-Nov. 2, 2007 (11 pages).
Xuxian Jiang et al., "Virtual Playgrounds for Worm Behavior Investigation", RAID 2005, LNCS 3858, pp. 1-21 (2006).
Min Gyung Kang et al., "Renovo: A Hidden Code Extract for Packed Executables", WORM'07, Nov. 2, 2007 (8 pages).
Christopher Kruegel et al., "Detecting Kernel-Level Rootkits Through Binary Analysis", In Proceedings of the Annual Computer Security Applications Conference (ACSAC), pp. 91-100, Dec. 2004.
Lorenzo Martignoni et al., "OmniUnpack: Fast, Generic, and Safe Unpacking of Malware", In Proceedings of the Annual Computer Security Applications Conference (ACSAC), pp. 431-441 (2007).
Thomas Raffetseder et al., "Detecting System Emulators", In ISC, pp. 1-18 (2007).
Paul Royal et al., "PolyUnpack: Automating the Hidden-Code Extraction of Unpack-Executing Maiware", In Proceedings of the Annual Computer Security Applications Conference (ACSAC), pp. 289-300 (2006).
Rich Uhlig et al., "Intel Virualization Technology", Computer, vol. 38, No. 5, pp. 48-56, May 2005.
Amit Vasudevan et al., "Stealth Breakpoints", In Proceedings of the 21st Annual Computer Security Applications Conference (ACSAC), pp. 381-392, (2005).
Amit Vasudevan et al., "Cobra: Fine-Grained Malware Analysis Using Stealth Localized-Executions", In Proceedings of the 2006 IEEE Symposium on Security and Privacy (S&P'06), pp. 264-279 (2006).
Yi-Min Wang et al., "Automated Web Patrol with Strider HoneyMonkeys: Finding Web Sites That Exploit Browser Vulnerabilities", In NDSS'06 (2006) (15 pages).
Heng Yin et al., "Panorama: Capturing System-Wide Information Flow for Malware Detection and Analysis", In Proceedings of ACM Conference on Computer and Communication Security, Oct. 29-Nov. 2, 2007 (13 pages).
Joanna Rutkowska, "Introducing Blue Pill", http://theinvisibilethings.blogspot.com/2006/06/introducing-blue-pill.html, Jun. 22, 2006 (26 pages).
Peter Ferrie, "Anti-Unpacker Tricks", In Proceedings of the 2nd International CARO Workshop (2008) (25 pages).
Danny Quist, "Covert Debugging Circumventing Software Armoring Techniques"; In Proceedings of Black Hat USA 2007 (2007) (5 pages).
Ulrich Bayer et al., "Scalable, Behavior-Based malware Clustering", In Network and Distributed System Security Symposium (2009) (18 pages).
David Brumley et al., "Automatically Identifying Trigger-Based Behavior in Malware", Botnet Detection, pp. 1-24 (2008).
Dancho Danchev, "Web Based Botnet Command and Control Kit 2.0", http://ddanchev.blogspot.com/2008/08/web-based-botnet-command-and-control.html, Aug. 22, 2008 (5 pages).
Ozgun Erdogan et al., "Hash-AV: Fast Virus Signature matching by Cache-Resident Filters", Int. J. Secur. Netw., vol. 2, pp. 50-59 (2007).
Fanglu Guo et al., "A Study of the Packer Problem and Its Solutions", In Recent Advances in Intrusion Detection (RAID 2008), LNCS 5230, pp. 95-115 (2008).
Maria Halkidi et al., "On Clustering Validation Techniques", Journal of Intelligent Information Systems, vol. 17, pp. 107-145 (2001).
A.K. Jain et al., "Data Clustering: A Review", ACM Computing Surveys, vol. 31, No. 3, pp. 264-323, Sep. 1999.

(56) References Cited

OTHER PUBLICATIONS

John P. John et al., "Studying Spamming Botnets using Botlab", In Usenix Symposium on Networked Systems Design and Implementation (NDSI), (2009) (16 pages).
Hyang-Ah Kim et al., "Autograph: Toward Automated, distributed Worm Signature Detection", In Usenix Security Symposium (2004) (16 pages).
Clemens Kolbitsch et al., "Effective and Efficient Maiware Detection at the End Host", In 18th Usenix Security Symposium, pp. 351-366 (2009).
Kevin Borders et al., "Protecting Confidential Data on Personal Computers with Storage Capsules", In 18th Usenix Security Symposium, pp. 367-382 (2009).
Ralf Hund et al., "Return-Oriented Rootkits: Bypassing Kernel Code Integrity Protection Mechanisms", In 18th Usenix Security Symposium, pp. 383-398 (2009).
Christian Kreibtch et al., "Honeycomb—Creating Intrusion Detection Signatures Using Honeypots", In ACM Workshop on Hot Topics in Networks (2003) (6 pages).
Zhichun Li et al., "Hamsa: Fast Signature Generational for Zero-Day Polymorphic Worms with Provable Attack Resilience", In IEEE Symposium on Security and Privacy (2006) (15 pages).
James Newsome et al., "Polygraph: Automatically Generating Signatures for Polymorphic Worms", In IEEE Symposium on Security and Privacy (2005) (16 pages).
Sun Wu et al., "AGREP—A Fast Approximate Pattern-Matching Tool", In Usenix Technical Conference (1992) (10 pages).
Vinod Yegneswaren et al.,, "An Architecture for Generating Semantics-Aware Signatures", In Usenix Security Symposium (2005) (16 pages).
Jaeyeon Jung, "Fast Portscan Detection Using Sequential Hypothesis Testing", In Proceedings of IEEE Symposium on Security Privacy, pp. 211-225 (2004).
Anestis Karasaridis et al., "Wide-Scale Botnet Detection and Characterization", In Usenix Workshop on Hot Topics in Understanding Botnets (HotBots'07), Apr. 11-13, 2007 (9 pages).
Carl Livades et al., "Using Machine Learning Techniques to identify Botnet Traffic", In 2nd IEEE LCN Workshop on Network Security (WoNS'2006), pp. 967-974 (2006).
"CVE-2006-3439", http://cve.mitre.org/cgi-bin/cvename.cgi?name=CVE-2006-3439, printed Jun. 27, 2012 (2 pages).
David Moore, "Inferring Internet Denial-of-Service Activity", In Proceedings of the 10th Usenix Security Symposium, Aug. 13-17, 2001 (15 pages).
Peng Ning, et al., "Constructing Attack Scenarios Through Correlation of Intrusion Alerts", In Proceedings of Computer and Communications Security (CCS'02), Nov. 18-22, 2002 (10 pages).
Vern Paxson, "Bro: A System for Detecting Network Intruders in Real-Time", In Proceedings of the 7th Usenix Security Symposium, Jan. 26-29, 1998 (22 pages).
Roberto Perdisci et al., "Using an Ensemble of One-Class SVM Classifiers to Harden Payload-Based Anomaly Detection Systems", In Proceedings of the 6th International Conference on Data Mining (ICDM'06), pp. 488-498, Dec. 2006.
Phillip A. Porras, "Privacy-Enabled Global Threat Monitoring", IEEE Security & Privacy, pp. 60-63 (2006).
Moheeb Abu Rajab et al., "A Multifaceted Approach to Understanding the Botnet Phenomenon", In Proceedings of the ACM SIGCOMM/Usenix Internet Measurement Conference (ICM'06), Oct. 25-27, 2006 (12 pages).
Anirudh Ramachandran et al., "Understanding the Network-Level Behavior of Spammers", In Proceedings of the 2006 Conference on Applications, Technologies, Architectures, and Protocols for Computer Communications (SIGCOMM'06), Sep. 11-16, 2006 (13 pages).
Martin Roesch, "SNORT—Lightweight Intrusion Detection for Networks", In Proceedings of 13th System Administration Conference (LISA'99), pp. 229-238, Nov. 7-12, 1999.
Robin Sommer et al., "Enhancing Byte-Level Network Intrusion Detection Signatures with Context", In Proceedings of the 10th ACM Conference on Computer and Communications Security (CCS'03), pp. 262-271, Oct. 27-30, 2003.
"W32/IRCBot-TO", http://www.sophos.com/virusinfo/analyses.w32ircbotto.html, Jan. 19, 2007 (1 page).
Stuart Staniford et al., "Practical Automated Detection of Stealthy Portscans", Journal of Computer Security, vol. 10, pp. 105-136 (2002).
S. Staniford-Chen et al., "GrIDS—A Graph Based Intrusion Detection System for Large Networks", In Proceedings of the 19th National Information Systems Security Conference, pp. 361-370 (1996).
Steven J. Templeton et al., "A Requires/Provides Model for Computer Attacks", In Proceedings of the 2000 Workshop on New Security Paradigms (NSPW'00), pp. 31-38 (2000).
Alfonso Valdes et al., "Probabilistic Alert Correlation", In Proceedings of the Recent Attack in Intrusion Detection (RAID 2001), LNCS 2212, pp. 54-68 (2001).
Fredrik Valeur et al., "A Comprehensive Approach to Intrusion Detection Alert Correlation", IEEE Transactions on Dependable and Secure Computing, vol. 1, No. 3, pp. 146-169, Jul. 2004.
Kjersti Aas et al., "Text Categorisation: A Survey", Norwegian Computing Center, Jun. 1999 (38 pages).
M. Andrews, "Negative Caching of DNS Queries (DNS NCACHE)", http://tools.ietf.org/html/rfc2308, Mar. 1998 (20 pages).
Simon Biles, "Detecting the Unknown with Snort and Statistical Packet Anomaly Detecting Engine", www.cs.luc.edu/~pld/courses/447/sum08/class6/biles.spade.pdf (2003) (9 pages).
James Newsome et al., "Paragraph: Thwarting Signature Learning by Training Maliciously", In Recent Advance in Intrusion Detection (RAID), 2005 (21 pages).
Jon Oberheide et al., "CloudAV: N-Version Antivirus in the Network Cloud", In Proceedings of the 17th Usenix Security Symposium, pp. 91-106 (2008).
Dan Pelleg et al., "X-Means: Extending K-Means with Efficient Estimation of the Number of Clusters", In International Conference on Machine Learning (2000) (8 pages).
Roberto Perdisci et al., "Misleading Worm Signature Generators Using Deliberate Noise Injection", In IEEE Symposium on Security and Privacy (2006) (15 pages).
Konrad Rieck et al., "Learning and Classification of Malware Behavior", DIMVA 2008, LNCS 5137, pp. 108-125 (2008).
Sumeet Singh et al., "Automated Worm Fingerprinting", In ACM/USENIX Symposium on Operating System Design and Implementation, Dec. 2004 (16 pages).
"EFnet Chat Network", http://www.efnet.org, dated Jun. 18, 2007 (3 pages).
Guofei Gu et al. "Bothunter: Detecting Malware Infection Through IDS-Driven Dialog Correlation", Proceedings of 16th USENIX Security Symposium, pp. 167-182 (2007).
R. Arends et al. , "Protocol Modifications for the DNS Security Extensions", http://www.ietf.org/rfc/rfc4035.txt, Mar. 2005 (50 pages).
R. Arends et al. , "DNS Security Introduction and Requirements", http://www.ietf.org/rfc/rfc4033.txt, Mar. 2005 (20 pages).
R. Arends et al. , "Resource Records for the DNS Security Extensions", http://www.ietf.org/rfc/rfc4034.txt, Mar. 2005 (28 pages).
Andreas Berger et al., "Assessing the Real-World Dynamics of DNS", Lecture Notes in Computer Science, vol. 7139, pp. 1-14 (2012).
Global Research & Analysis Team (GReAT), "Full Analysis of Flame's Command & Control Servers", http://www.securelist.com/en/blog/750/Full_Analysis_of_Flames_Command_Control_Servers, Sep. 17, 2012 (10 pages).
Steiner H. Gunderson, "Global IPv6 Statistics: Measuring the Current State of IPv6 for Ordinary Users", http://meetings.ripe.net/ripe-57/presentations/Colitti-Global_IPv6_statistics_-_Measuring_the_current_state_of_IPv6_for_ordinary_users_.7gzD.pdf, Oct. 24-30, 2008 (20 pages).
Jaeyeon Jung et al., "Modeling TTL-Based Internet Caches", IEEE INFOCOM 2003, pp. 417-426, Mar. 2003.

(56) References Cited

OTHER PUBLICATIONS

Zhuoqing Morley Mao et al., "A Precise and Efficient Evaluation of the Proximity Between Web Clients and Their Local DNS Servers", In Proceedings of USENiX Annual Technical Conference (2002) (14 pages).
Mozilla Foundation, "Public Suffix List", http://publicsuffix.org/, printed May 23, 2013 (8 pages).
David Plonka et al., "Context-Aware Clustering of DNS Query Traffic", In Proceedings of the 8th IMC (2008) (13 pages).
Steve Souders, "Sharding Dominant Domains", http://www.stevesouders.com/blog/2009/05/12/sharding-dorninant-domains, May 12, 2009 (3 pages).
Paul Vixie, "What DNS Is Not", Communications of the ACM, vol. 52. No. 12, pp. 43-47, Dec. 2009.
Florian Weimer, "Passive DNS Replication", In Proceedings of the 17th Annual FIRST Conference on Computer Security Incident, Apr. 2005 (13 pages).
T. Berners-Lee et al., "RFC3986—Uniform Resource Identifier (URI): Generic Syntax", http://www.hjp.at/doc/rfc/rfc3986.html, Jan. 2005 (62 pages).
Chih-Chung Chang et al., "LIBSVM: A Library for Support Vector Machines" ACM Transactions on Intelligent Systems and Technology 2011, Last Updated Jun. 14, 2007 (26 pages).
D. De La Higuera et al., "Topology of Strings: Median String is NP-Complete", Theoretical Computer Science, vol. 230, pp. 39-48 (2000).
Guofei Gu et al., "BotSniffer: Detecting Botnet Command and Control Channels in Network Traffic", In Proceedings of the 15th Annual Network and Distributed System Security Symposium (NDSS'08), Feb. 2008 (18 pages).
J. Zico Kolter et al., "Learning to Detect and Classify Malicious Executables in the Wild", Journal of Machine Learning Research, vol. 7, pp. 2721-2744, Dec. 2006.
John C. Platt, "Probablistic Outputs for Support Vector Machines and Comparisons to Regularized Likelihood Methods", Advances in Large margin Classifiers, vol. 10, No. 3, pp. 61-74, Mar. 26, 1999.
Peter Wurzinger et al., "Automatically Generating Models for Botnet Detection", In Proceedings of the 14th European Conference on Research in Computer Security (ESORICS'09), pp. 232-249 (2009).
Yinglian Xie et al., "Spamming Botnet: Signatures and Characteristics", In Proceeding of the ACM SIGCOMM 2008 Conference on Data Communications (SIGCOMM'08), pp. 171-182, Aug. 17-22, 2008.
Nello Cristianini et al., "An Introduction to Support Vector Machines: and other Kernal-Based Learning Methods", Cambridge University Press, New York, NY, USA (2000).
Timo Sirainen, "IRSSI", http://en.wikipedia.org/wiki/Irssi, updated May 8, 2013 (3 pages).
Team Cymru, "IP to ASN Mapping", http://www.team-cymru.org/Services/ip-to-asn.html, printed Mar. 23, 2013 (6 pages).
http://www.bleedingsnort.com, retrieved from Internet Archive on May 23, 2013, Archived Sep. 26, 2006 (3 pages).
http://www.dshield.org, retrieved from Internet Archive on May 23, 2013, Archived Sep. 29, 2006 (2 pages).
http://www.alexa.com, retrieved from Internet Archive on May 23, 2013, Archived Sep. 25, 2006 (3 pages).
https://sie.isc.org/, retrieved from Internet Archive on May 23, 2013, Archived Dec. 29, 2008 (2 pages).
http://damballa.com, retrieved from Internet Archive on May 23, 2013, Archived Jan. 28, 2007 (10 pages).
http://www.dnswl.org, retrieved from Internet Archive on May 23, 2013, Archived Jul. 15, 2006 (4 pages).
http://www.spamhaus.org/sbl/, retrieved from Internet Archive on May 23, 2013, Archived Sep. 24, 2006 (24 pages).
http://malwaredomains.com, retrieved from Internet Archive on May 23, 2013, Archived Dec. 28, 2007 (12 pages).
http://www.opendns.com, retrieved from Internet Archive on May 23, 2013, Archived Sep. 9, 2006 (25 pages).
https://zeustracker.abuse.ch, retrieved from Internet Archive on May 23, 2013, Archived Oct. 26, 2010 (37 pages).
http://www.threatfire.com, retrieved from Internet Archive on May 23, 2013, Archived Aug. 22, 2007 (18 pages).
http://www.avira.com, retrieved from Internet Archive on May 23, 2013, Archived Sep. 29, 2006 (13 pages).
https://alliance.mwcollect.org, retrieved from Internet Archive on May 23, 2013, Archived Jan. 7, 2007 (2 pages).
http://malfease.oarci.net, retrieved from Internet Archive on May 23, 2013, Archived Apr. 12, 2008 (1 pages).
http://www.oreans.com/themida.php, retrieved from Internet Archive on May 23, 2013, Archived Aug. 23, 2006 (12 pages).
http://www.vmware.com, retrieved from Internet Archive on May 23, 2013, Archived Sep. 26, 2006 (32 pages).
http://anubis.seclab.tuwien.ac.at, retrieved from Internet Archive on May 23, 2013, Archived Apr. 9, 2008 (2 pages).
http://www.siliconrealms.com, retrieved from Internet Archive on May 23, 2013, Archived Sep. 4, 2006 (12 pages).
http://bitblaze.cs.berkeley.edu, retrieved from Internet Archive on May 23, 2013, Archived Jan. 28, 2008 (4 pages).
http://www.dyninst.org, retrieved from Internet Archive on May 23, 2013 Archived Aug. 20, 2006 ( pages).
http://www.peid.info, retrieved from Internet Archive on May 23, 2013, Archived Dec. 4, 2007 (2 pages).
Mark Russinovich et al., "RegMon for Windows V7.04", http://technet.microsoft.com/en-us/sysinternals/bb896652.aspx, Published Nov. 1, 2006 (4 pages).
"Troj/Agobot-IB", http://www.sophos.com/virusinfo/analyses/trojagobotib.html, printed Jun. 27, 2012 (1 page).
Mark Russinovich et al., "FileMon for Windows V7.04", http://technet.rnicrosoft.com/en-us/sysinternals/bb896642.aspx, Nov. 1, 2006 (6 pages).
"Norman Sandbox Whitepaper", Copyright Norman 2003 (19 pages).
F. Heinz et al., "IP Tunneling Through Nameserver", http://slashdot.org/story/00/09/10/2230242/ip-tunneling-through-nameservers, Sep. 10, 2000 (23 Pages).
http://www.mcafee.com/us/, printed May 23, 2013 (23 pages).
"Windows Virtual PC", http://en.wikipedia.org/wiki/Windows_Virtual_PC, Last Modified May 5, 2013, Printed May 23, 2013 (21 pages).
Par Fabian Perigaud, "New Pill?", http://cert.lexsi.com/weblog/index.php/2008/03/21/223-new-pill, Mar. 21, 2008 (3 pages).
http://handlers.sans.org/jclausing/userdb.txt, printed May 24, 2013 (149 pages).
Avi Kivity et al., "KVM: The Linux Virtual Machine Monitor", Proceedings of the Linux Symposium, pp. 225-230, Jun. 27-30, 2007.
Symantec, "Symantec Global Internet Security Threat Report: Trends for 2008", vol. XIV, Apr. 2009 (110 pages).
File History of U.S. Appl. No. 13/008,257.
File History of U.S. Appl. No. 13/358,303.
File History of U.S. Appl. No. 11/538,212.
File History of U.S. Appl. No. 12/985,140.
File History of U.S. Appl. No. 14/304,015.
File History of U.S. Appl. No. 12/538,612.
File History of U.S. Appl. No. 13/205,928.
File History of U.S. Appl. No. 13/309,202.
File History of U.S. Appl. No. 14/015,582.
File History of U.S. Appl. No. 14/015,704.
File History of U.S. Appl. No. 14/015,661.
File History of U.S. Appl. No. 14/041,796.
File History of U.S. Appl. No. 14/194,076.
Leo Breiman, "Bagging Predictors", Machine Learning, vol. 24, pp. 123-140 (1996).
David S. Anderson et al., "Spamscatter: Characterizing Internet Scam Hosting Infrastructure", Proceedings of the USENIX Security Symposium (2007) (14 pages).
Sujata Garera et al., "A Framework for Detection and Measurement of Phishing Attacks", WORM'07, pp. 1-8, Nov. 2, 2007.
Torsten Horthorn et al., "Double-Bagging: Combining Classifiers by Bootstrap Aggregation", Pattern Recognition, vol. 36, pp. 1303-1309 (2003).

(56) References Cited

OTHER PUBLICATIONS

Roberto Perdisci et al., "Detecting Malicious Flux Service Networks Through Passive Analysis of Recursive DNS Traces", Proceedings of ACSAC, Honolulu, Hawaii, USA (2009) (10 pages).
Shuang Hao et al., "Detecting Spammers with SNARE: Spatiotemporal Network-Level Automatic Reputation Engine", 18th USENIX Security Symposium, pp. 101-117 (2009).
Kazumichi Sato et al., "Extending Black Domain Name List by Using Co-Occurrence Relation Between DNS Queries", Presentation in the Third USENIX LEET Workshop (2010) (22 pages).
Sushant Sinha et al., "Shades of Grey: On the Effectiveness of Reputation-Based Blacklists", In 3rd International Conference on Malware (2008) (8 pages).
Zhiyun Qian et al., "On Network-Level Clusters for Spam Detection", In Proceedings of the USENIX NDSS Symposium (2010) (17 pages).
Bojan Zdrnja et al., "Passive Monitoring of DNS Anomalies", In Proceedings of DIMVA Conference (2007) (11 pages).
Jian Zhang et al., "Highly Predictive Blacklisting", In Proceedings of the USENIX Security Symposium (2008) (16 pages).
http://www.uribl.com/about.shtml, retrieved from Internet Archive on Mar. 16, 2016, Archived Jul. 22, 2010 (4 pages).
http://www.spamhaus.org/zen/, retrieved from Internet Archive on Mar. 16, 2016, Archived Jul. 6, 2010 (3 pages).
Mathew Sullivan, "Fighting Spam by Finding and Listing Exploitable Servers", Apricot 2006 (26 pages).
Mekky et al. (Detecting Malicious HTTP Redirections Using Trees of User Browser Activity, IEEE INFOCOM 2014, pp. 1159-1167).
File History of U.S. Appl. No. 14/015,621.
U.S. Appl. No. 15/019,272, filed Feb. 9, 2016, Pending.
U.S. Appl. No. 11/538,212, 2008-0028463, Jan. 31, 2008, U.S. Pat. No. 8,566,928.
U.S. Appl. No. 12/985,140, 2011-0167495, Jul. 7, 2011, U.S. Pat. No. 8,578,497.
U.S. Appl. No. 13/205,928, 2012-0042381, Feb. 16. 2012, Pending.
U.S. Appl. No. 14/015,661, 2014-0245436, Aug. 28, 2014, Pending.
U.S. Appl. No. 14/194,076, filed Feb. 28, 2014, Pending.
U.S. Appl. No. 14/304,015, filed Jun. 13, 2014, Abandonded.
U.S. Appl. No. 14/616,387, filed Feb. 6, 2015, Pending.
U.S. Appl. No. 14/668,329, filed Mar. 25, 2015, Pending.
Alam et al. "Webinar: Intel Virtualization Technology of Embedded Applications" (2010) Intel (34 pages).
Antonakakis e tal. "Building a Dynamic Reputation System for DNS" (Aug. 11-13, 2010) *19th USENIX Security Symposium*, Washington, DC (17 pages).
Antonakakis et al. "Detecting Malware Domains in the Upper DNS Hierarchy" (Aug. 8-12, 2011) *Proceedings of the 20th USENIX Security Symposium*, Washington, DC pp. 1-16.
Antonakakis et al. "From Throw-Away Traffic to Bots: Detecting the Rise of DGA-Based Malware" (2012) *Proceedings of the 21st USENIX Conference on Security Symposium*, Washington, DC (16 pages).
Antonakakis et al. "The Command Structure of the Aurora Bonet" (2010) http://www.damballa.com/downloads/r_pubs/Aurora_Botnet_Command_Structure.pdf (31 pages).
Antonakakis et al. "Unveiling the Network Criminal Infastructure of TDSS/TDL4" (undated) http://www.damballa.com/downloads/r_pubs/Damballa_tdss_td14_case_study_public.pdf (16 pages).
Bilge et al. "EXPOSURE: Finding Malicious Domains Using Passive DNS Analysis" (Feb. 6-9, 2011) 18th Annual Network and Distributed System Security Symposium (17 pages).
Bishop "Pattern Recognition and Machine Learning" (2006) Springer-Verlag New York, Inc., Secauscus, NJ.
Conficker Working Group "Conficker Working Group: Lessons Learned" (Jan. 2011) Conficker_Working_Group_Lessons_Learned_17_June_2010_final.pdf, pp. 1-59.
Cyber-Ta, http://cyber-ta.org/releases/botHunter/index.html, retrieved from Internet Archive on May 23, 2013, Archived Aug. 30, 2007, pp. 1-6.
Danchev "Leaked DIY Malware Generating Tool Spotted in the Wild" (Jan. 18, 2013) (6 pages) http://blog.webroot.com/2013/01/18/leaked-diy-malware-generating-tool-spotted-in-the-wild.
Edmonds "ISC Passive DNS Architecture" (Mar. 2012) http://kb.isc.org/getAttach/30/AA-00654/passive-dns-architecture pp. 1-18.
Egele et al. "A Survey on Automated Dynamic Malware-Analysis Techniques and Tools" (Feb. 2012) *ACM Computing Surveys* 44(2)(6):1-6:42.
Falliere et al. "W32.Stuxnet Dossier" (Feb. 2011) http://www.symantec.com/content/en/us/enterprise/media/security_response/whitepapers/w32_stuxnet_dossier.pdf, Version 1.4:1-69.
Felegyhazi et al. "On the Potential of Proactive Domain Blacklisting" (2010) Third USENIX LEET Workshop, pp. 1-8.
Fisher "Zeus Source Code Leaked" (May 10, 2011) http://threatpost.com/en_us/blogs/zeus-source-code-leaked-051011 (6 pages).
Geide "Another Trojan Barnital Pattern" (May 6, 2011) http://research.zscaler.com/2011/05/another-trojan-bamital-pattern.html pp. 1-5.
Hao et al. "An Internet-Wide View into DNS Lookup Patterns" (2010) http://labs.verisign.com/projects/malicious-domain-names/white-paper/dns-imc2010.pdf, pp. 1-6.
Holz et al. "Measuring and Detecting Fast-Flux Service Networks" (2008) Proceedings of NDSS (12 pages).
Jacob "Jackstraws: Picking Command and Control Connections from Bot Traffic" (2011) Proceedings of the 20th USENIX Conference on Security (SEC'11), pp. 1-16.
Jang et al. "Bitshred: Feature Hashing Malware for Scalable Triage and Semantic Analysis" (Oct. 17-21, 2011) Proceedings of the 18th ACM Conference on Computer and Communications Security (CCS'11), pp. 309-320.
Jiang et al. "Identifying Suspicious Activities Through DNS Failure Graph Anaylsis" (2010) 18th IEEE International Conference on Network Protocols (ICNP' 10) Washington, DC, pp. 144-153.
Kreibich "Honeycomb: Automated Signature Creation Using Honeypots" (Mar. 26, 2007) http://www.icir.org/christian/honeycomb/index.html (3 pages).
Krishnan et al. "DNS Prefetching and Its Privacy Implications: When Good Things Go Bad" (2010) 3rd USENIX Conference on Large-Scale Exploits and Emergent Threats: Botnets, Spyware, Worms, and More (LEET'10), pp. 1-9.
Ligh et al. "Malware Analyst's Cookbook and DVD" (2010) Wiley Publishing, Indianapolis, IN.
Microsoft Encyclopedia "Trojan: Java/Boonan" (last published Apr. 16, 2011) http://microsoft.com/security/portal/threat/encyclopedia/entry.apsx?Name=Trojan%3AJava%2FBoonan, pp. 1-2.
Newman "Networks: An Introduction" (Sep. 2010) Oxford University Press (TOC).
Perdisci et al. "Behavioral Clustering of HTTP-Based Malware and Signature Generation Using Malicious Network Traces" (2010) USENIX Symposium on Networked Systems Design and Implementation (NSDI 2010), pp. 1-16.
Ptacek "Side-Channel Detection Attacks Against Unauthorized Hyervisors" (Aug. 20, 2007) http://www.matasano.com/log/930/side-channel-detection-attacks-against-unauthorized-hypevisors, retrieved from Internet Archive on May 23, 2013, pp. 1-12.
RSA Fraudaction Research Labs, "Anatomy of an Attack" (Apr. 1, 2011) http://blogs.rsa.com/rivner/anatomy-of-an-attack, pp. 1-17.
Shevchenko "Domain Name Generator for Murofet" (Oct. 14, 2010) http://blog.threatexpert.com/2010/10/domain-name-generator-for-murofet.html, pp. 1-4.
Soumenkov et al. "TDL4—Top Bot" (Jun. 27, 2011) http://www.secuirlist.com/en/analysis/204792180/tdl4_top_bot pp. 1-18.
Stone-Gross et al. "Pushdo Downloader Variant Generating Fake HTTP Requests" (Aug. 31, 2012) http://www.secureworks.com/cyber-threat-intelligence/threats/Pushdo_Downloader_Variant_Generating_Fake_HTTP_Requests, pp. 1-4.
Symantec Global "Symantec Global Internet Security Threat Report: Trends for 2008" (Apr. 2009), Cupertino, CA, XIV:1-110.
Trendmicro website (retrieved Oct. 2013) http://www.trendmicro.com/en/home/us/home.htm.

(56) References Cited

OTHER PUBLICATIONS

Urbanek "RJava: Low-Level-R to Java Interface" (May 6, 2013) pp. 1-5.
Weaver et al. "Redirecting DNS for ADS and Profit" (Aug. 2011) USENIX Workshop on Free and Open Communications on the Internet (FOCI), pp. 1-6.
Williams "What We Know (and Learn) for the Waledac Takedown" (Mar. 15, 2010) http://blogs.technet.com/b/mmpc/archive/2010/03/15/what-we-know-and-learned-form-the-waledac-takedown-aspx, pp. 1-3.
Yadav et al. "Detecting Algorithmically Generated Malicious Domain Names" (Nov. 1-3, 2010) $10^{th}$ Annual Conference of Internet Measurement (IMC'10), pp. 48-61.
Zhou et al., "Dissecting Android Malware: Characterization and Evolution" (2012) IEEE Symposium on Security and Privacy, pp. 95-109.
File History of U.S. Appl. No. 13/749,205.
File History of U.S. Appl. No. 14/010,016.
File History of U.S. Appl. No. 14/015,663.
File History of U.S. Appl. No. 14/096,803.
File History of U.S. Appl. No. 14/305,998.
File History of U.S. Appl. No. 14/317,785.
File History of U.S. Appl. No. 14/616,387.
File History of U.S. Appl. No. 14/668,329.
File History of U.S. Appl. No. 15/019,272.
Nan Jiang et al., "Identifying Suspicious Activities Through DNS Failure Graph Analysis", In proceedings of the 18th IEEE International Conference on Network Protocols (ICNP'10) IEEE Computer Society, Washington, DC, USA, 144-153 (2010).
Kristoff, Botnets, Detection and Mitigation: DNS-Based Techniques, NU Security Day (2005) 23 pages, www.it.northwesterd.edu/bin/docs/bots_Kristoff_jul05.ppt.
Bailey et al. "Automated Classification and Analysis of Internet Malware" (Apr. 26, 2007) RAID 2007, LNCS 4637, pp. 178-197.
Caballero et al. "Measuring Pay-Per-Install: The Commoditization of Malware Distribution" (2011) Proceedings of the 20th USENIX Conference on Security (SEC'11) pp. 1-16.
Park et al. "Fast Malware Classification by Automated Behavioral Graph Matching" (2010) Proceedings of the Sixth Annual Workshop on Cyber Security and Information Intelligence Research (CSIIRW '10), ACM pp. 1-4.
Team Cymru "Developing Botnets" (2010) http://www.team-cymru.com/ReadingRoom/Whitepapers/2010/developing-botnets.pdf, pp. 1-3.
"Spamming Botnets: Signatures and Characteristics" Xie et al; ACM SIGCOMM. Settle. WA; Aug. 2008; 12 pages (Year: 2008).

\* cited by examiner

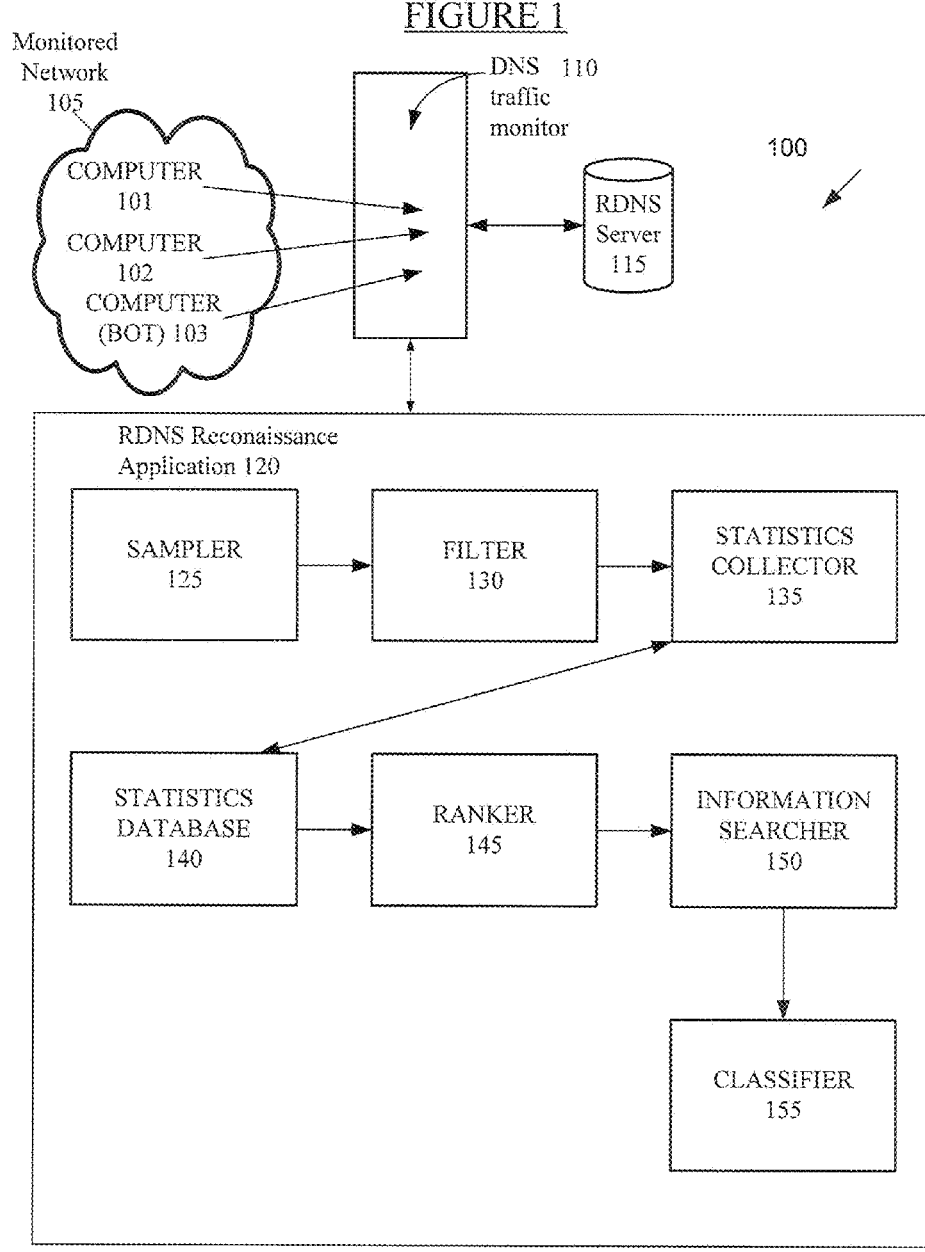

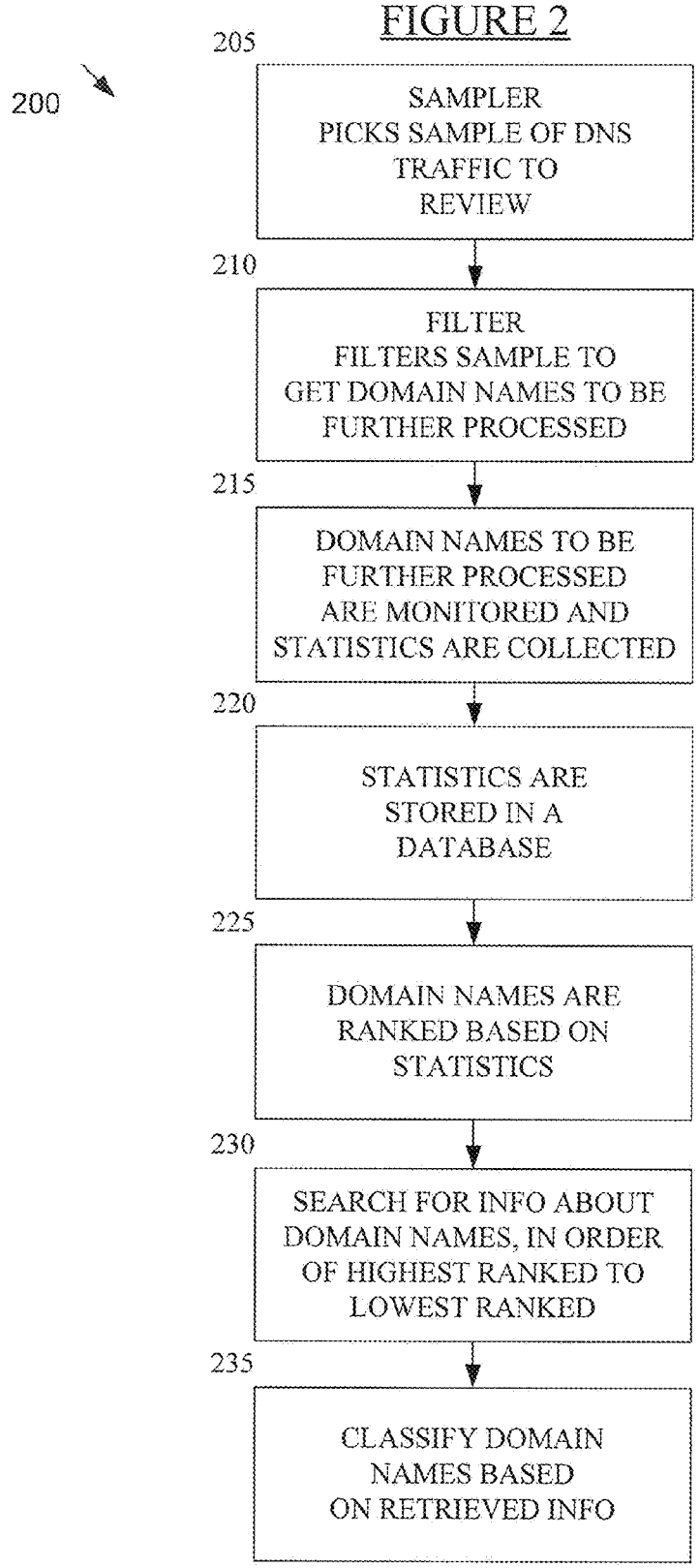

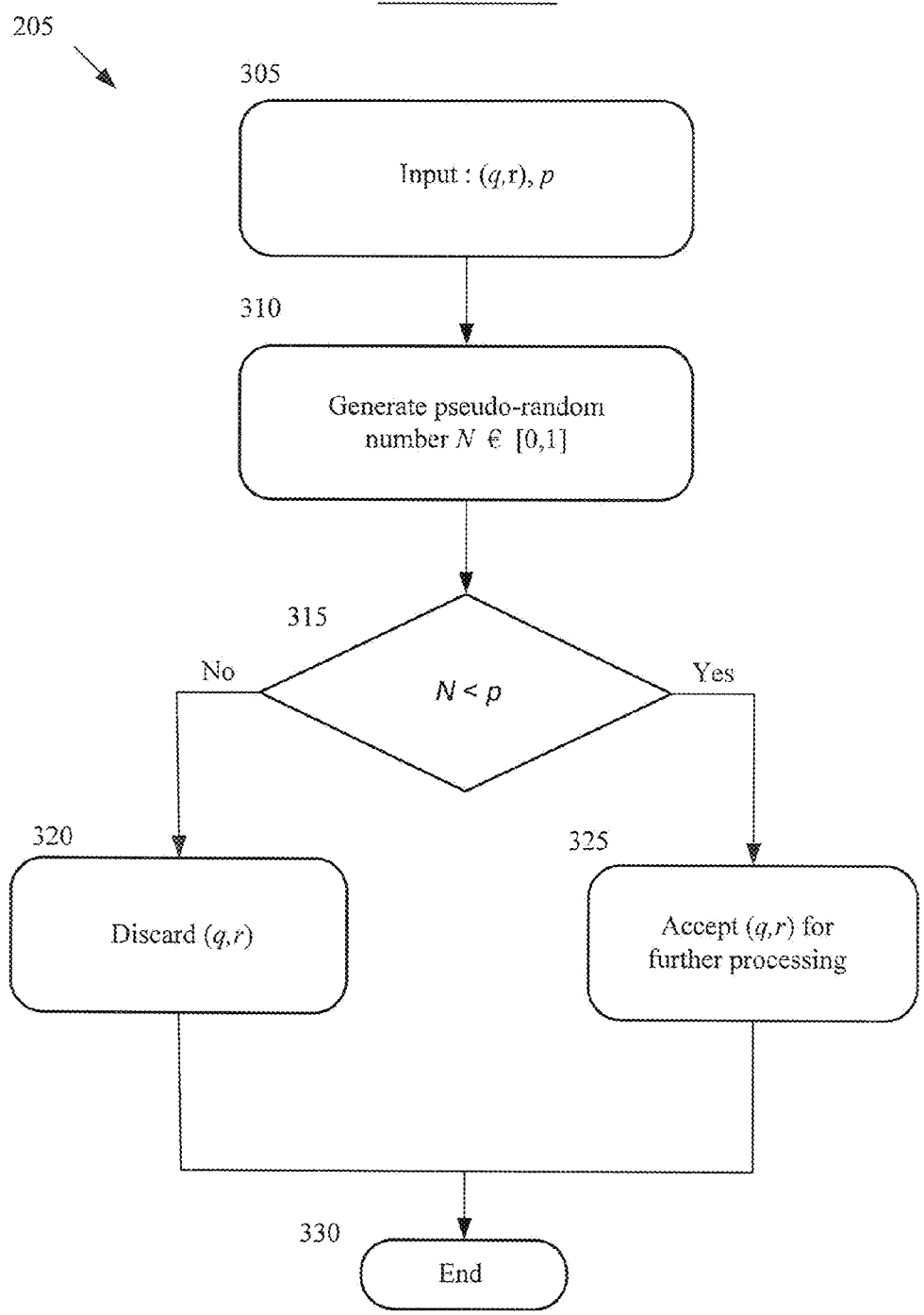

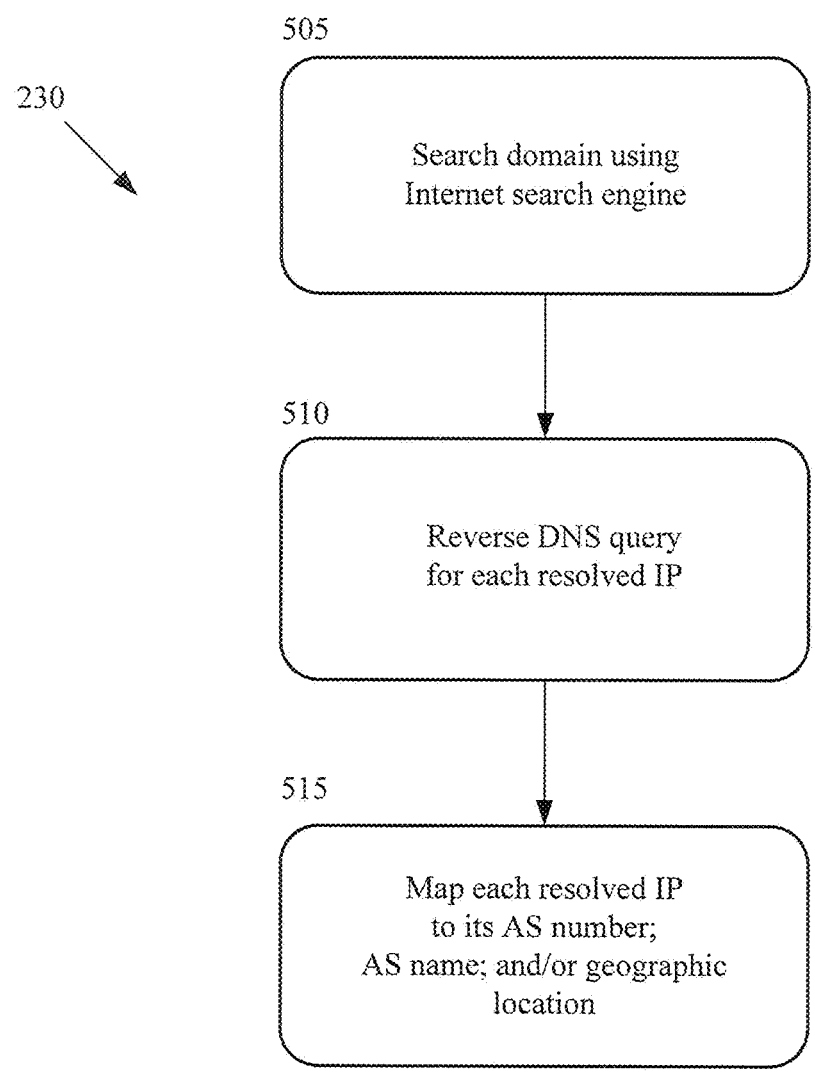

METHOD AND SYSTEM FOR DETECTING MALICIOUS AND/OR BOTNET-RELATED DOMAIN NAMES

CROSS-REFERENCE TO RELATED APPLICATIONS

This application is based on and derives the benefit of the filing date of U.S. Provisional Patent Application No. 61/087,873, filed Aug. 11, 2008. The entire content of this application is herein incorporated by reference in its entirety.

BRIEF DESCRIPTION OF THE FIGURES

FIG. 1 illustrates a system 100 of detecting malicious and/or botnet-related domain names, according to one embodiment.

FIG. 2 illustrates a method of detecting botnet-related domain names, according to one embodiment.

FIG. 3 illustrates details of sampling DNS traffic, according to one embodiment, such as set forth in 205 of FIG. 2.

FIG. 5 illustrates details related to searching for information about domain names by information searcher 150 as set forth in 230 of FIG. 2, according to one embodiment.

DETAILED DESCRIPTION OF EMBODIMENTS OF THE INVENTION

Figure 4A:
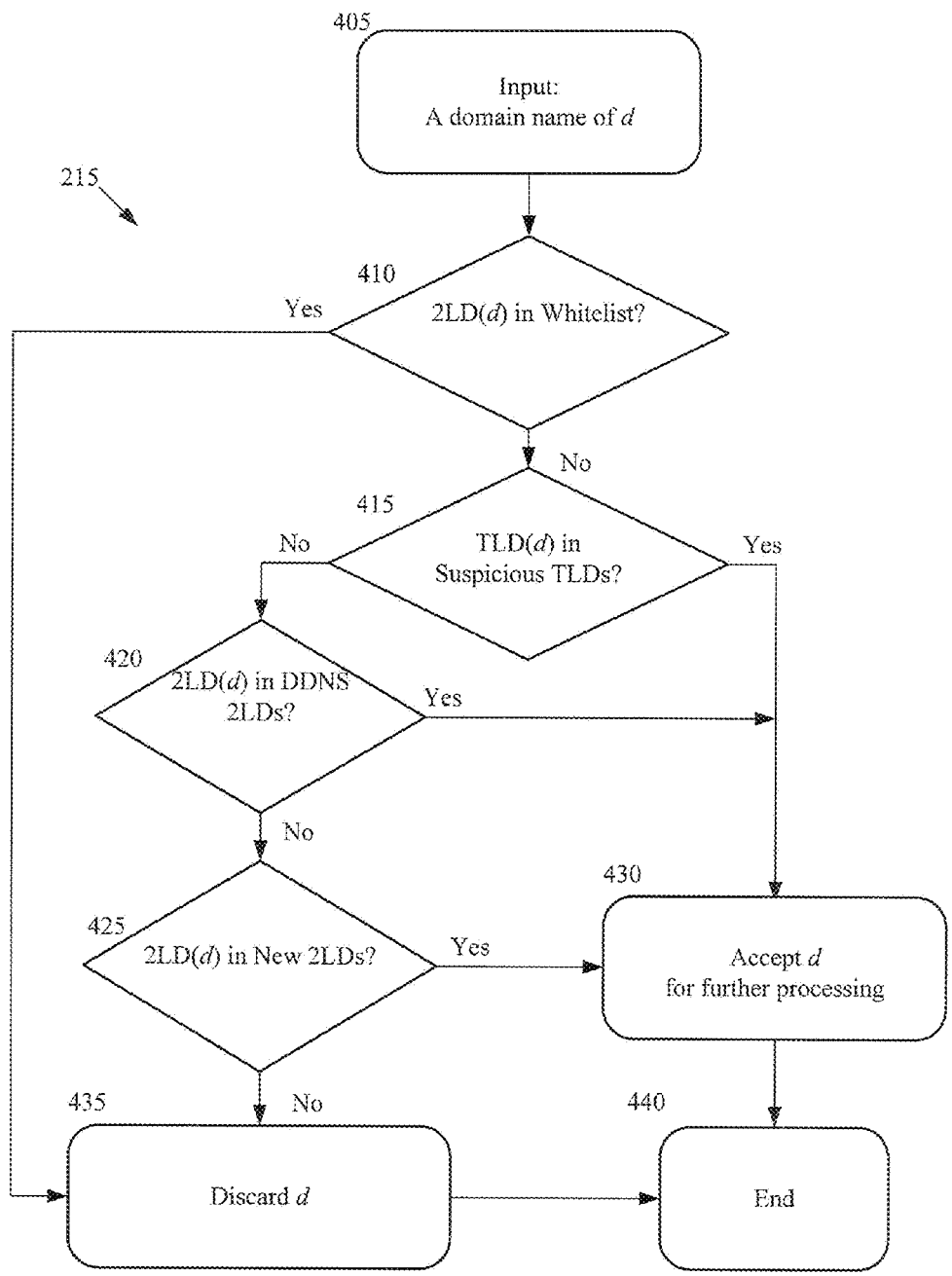
FIG. 4A illustrates details of filtering domain names for further processing in filter 130, as set forth in 210 of FIG. 2, according to one embodiment.

FIG. 1 illustrates a system 100 of detecting malicious and/or botnet-related domain names, according to one embodiment. The system 100 can comprise a DNS (Domain Name System) traffic monitor 110 that can be placed between a RDNS (Recursive Domain Name System) server 115, and a monitored network 105 with computers 101, 102, and 103. Note that one or more of these computers (e.g., 103) can be a bot. The DNS traffic monitor 110 can be connected to RDNS reconnaissance application 120. The RDNS reconnaissance application 120 can include a sampler 125, a filter 130, a statistics collector 135, a statistics database 140, a ranker 145, an information searcher 150, and a classifier 155.

The sampler 125 can sample DNS traffic between the monitored network 105 and the RDNS server 115 for further processing, according to one embodiment. The sampler 125 can sample DNS queries and their related responses according to a probability p. For example, assuming p=0.2, each DNS query and its response has a 20% chance to be included in the sample. The value of p can be varied in order to alter the desired sample-size.

The filter 130 can filter DNS traffic for further processing, according to one embodiment. For each domain name d that is in the sample of DNS traffic selected by the sampler 125, the filter 130 can determine whether to discard that domain name or accept it for further processing. According to one embodiment, the filter 130 can extract from domain d its top level domain (TLD(d)) and its second level domain (2LD(d)). Thus, for example, if d=domain.example.com, then TLD(d)=com, and 2LD(d)=example.com. The filter 130 can then check to see if TLD(d) or 2LD(d) are contained in certain lists of top level domains and second level domains. For example, 2LD(d) can be checked against a whitelist of known and legitimate second level domains. Additionally, TLD(d) can be checked against a list of suspicious top level domains. Furthermore, 2LD(d) can be checked against a list of dynamic DNS second level domain names, and then can be checked against another list of newly created second level domains. The filter 130 can then use the results of these queries to determine whether to discard domain name d or to accept it for further processing.

The statistics collector 135 can collect statistics about domain names that have been accepted for further processing by the filter 130, according to one embodiment. The statistics collector 135 can monitor these domain names over a period of time T. For example, if T=1 day, the statistics collector 135 can monitor each domain name for a period of one day. The statistics collector 135 can collect information about each domain name d over period T, such as, but not limited to: the number of queries to domain d observed during T, the number of distinct resolved IP addresses during T for the domain d, and the number of distinct source IP addresses that queried d during time T; the maximum number of queries for a certain domain issued by a single source IP address in any given subinterval $T_i<T$; the number of error messages received as a response to queries to a certain domain name; the number of NX domain (non-existent domain) responses; and the entire set of source IP address and resolved IP addresses extracted from the DNS queries and related responses.

The statistics database 140 can store the data that the statistics collector 135 gathered, according to one embodiment. For example, a relational database can be used to store this data. A relational database can be a structured collection of data that uses tables comprised of rows and columns to store the desired information.

The ranker 145 can rank domain names based on their suspiciousness and can accept some domain names for further processing, according to one embodiment. The ranker 145 can retrieve statistics from the statistics database 140. The ranker 145 can then calculate a suspiciousness score for each domain name d over a period of time T. For example, the ranker 145 can calculate a suspiciousness score as a ratio of the number of queries to domain d observed during T to the number of distinct source IP addresses that queried domain d during time T. The ranker 145 can rank each domain name based on its suspiciousness score. The ranker can then discard domain names with low suspiciousness scores and accept domain names with high suspiciousness scores for further processing. For example, the ranker 145 can compare each domain name's suspiciousness score to a provided threshold I in order to determine if it should be discarded or accepted for further processing.

The information searcher 150 can search for further information about the domain names that were accepted for further processing by the ranker 145, according to one embodiment. The information searcher 150 can use Internet search engines to search for a given domain name d, and the top n results of each Internet search can then be collected. For example, if n=10, the top 10 search results will be collected. If any of the top n results contains a link to a known malware analysis website, then the contents of that linked page can also be collected. The information searcher 150 can also conduct reverse DNS lookups for each resolved IP address for a given domain name d. The information searcher 150 can also perform a mapping between each resolved IP address for a given domain name d and the Autonomous System (AS) that it belongs to. An autonomous system can be a set of IP addresses under the control of one network operator or organization that has a clearly defined routing policy to the Internet. An AS is uniquely identified by an AS number and an AS name.

The classifier 155 can classify domain names into categories, such as, but not limited to: malicious, suspicious, or legitimate, according to one embodiment. The malicious category can include domain names that are clearly malware-related and likely to be botnet-related. The suspicious category can represent domain names that are likely to be malware-related, but for which further analysis is required. Finally, the legitimate category can represent domain names that are not related to any suspicious activity. The classifier can classify each domain name by examining: the domain name, a set of resolved IP addresses for that domain name, the statistics for that domain name collected by statistics collector 135 and stored by statistics database 140, the Internet search results gathered by the information searcher 150, a list of known malicious IP addresses and autonomous systems, a database of domain names from a malware analysis tool, a query volume threshold and a list of known malware analysis websites.

FIG. 2 illustrates a method of detecting botnet-related domain names, according to one embodiment. In 205, a sampler 125 can pick a sample of Domain Name System (DNS) traffic to review. This process is explained in more detail with respect to FIG. 3 below. In 210, a filter 130 can filter the sample of DNS traffic to get domain names to be further processed. This process is explained in more detail with respect to FIG. 4A below. Once the domain names have been filtered in 210, the domain names that have been accepted for further processing can be monitored and statistics can be collected by statistics collector 135 in 215. Statistics can be collected over a period of time T. For example, if T=1 day, then statistics for each domain name would be collected over a one day period. The statistics collected for each domain name d can include, but are not limited to: the number of queries to domain d observed during T (query_volume(d, T)), the number of distinct resolved internet protocol (IP) addresses during T for the domain d (resolved_IPs(d, T)), and the number of distinct source IP addresses that queried domain d during T (num_source_IPs(d, T)). In 220, the statistics can then be stored in a database 140. In one embodiment, the statistics can be stored in a relational database. A relational database can be a structured collection of data that uses tables comprised of rows and columns to store the desired information. In 225, domain names can be ranked in ranker 145 based on a suspiciousness score which is computed for each domain name d and each epoch T (s(d, T)) based upon the statistics stored in 220. This process is explained in more detail with respect to FIG. 4B below. In 230, information searches can be conducted by information searcher 150 for the domain names that were considered for further processing in 225. This process is explained in more detail with respect to FIG. 5 below. In 235, the domain names can be classified in classifier 155 as either malicious, suspicious, or legitimate, based upon examination of the retrieved information. This process is explained in more detail with respect to FIG. 6 below.

FIG. 3 illustrates details of sampling DNS traffic, according to one embodiment, such as set forth in 205 of FIG. 2. In 305, a DNS query q, its related response r, and a probability p are accepted as input parameters to sampler 125. For example, the method could accept the DNS query q=www.example.com, the related response r=123.123.123.123 which could represent the IP address that corresponds to the query q, and a probability p=0.20. The probability p represents the probability that a given query q and response r will be sampled for further processing. Thus, for example, when p=0.20, an estimated 20% of traffic will be sampled for further processing, and the other 80% of traffic will be discarded. In 310, a pseudorandom number N ranging between and including 0 and 1 can be generated using a uniform distribution. For example, a pseudorandom number N=0.6 can be generated. A person having ordinary skill in the art can recognize that there are many different algorithms available to generate a pseudorandom number. For example, the following algorithm can be used: For example, a Linear Congruential Generator (LCG) algorithm can be used, so that the next integer pseudo random number is computed as $X(i+1)=(aX(i)+c) \mod m$, where $m>0$, $0<=a<m$, $0<=c<m$ and $X(0)$ is a "seed" number between 1 and $m-1$. We can then take the number $N=X(i)/(m-1)$ as the result at each trial i. Note that this is just one example of an algorithm, and that those of ordinary skill in the art will see that many other algorithms may be used. In 315, the pseudorandom number N can be compared against the input parameter p. If N is greater than or equal top in 315, then the method will proceed to 320. On the other hand, if N is less than p in 315, then the method will proceed to 325. For example, if N=0.6 and p=0.2, then N is greater than or equal to p, and therefore the method will proceed to 320. In another example, if N=0.1 and p=0.2, then N is less than p, and therefore the method will proceed to 325. In 320, the DNS query q and its related response r can be discarded. In 325, the DNS query q and its related response r can be accepted for further processing as indicated in FIG. 2. In 330, the sampling method of FIG. 3 ends.

FIG. 4A illustrates details of filtering domain names for further processing in filter 130, as set forth in 210 of FIG. 2, according to one embodiment. In 405, a domain name d can be accepted as an input parameter. The domain name d can be part of the sample of domain names that was gathered in 205 of FIG. 2. The top level domain name, TLD(d), can be extracted from the domain name d. For example, if d=domain.example.com, then TLD(d)=com. Additionally, the second level domain name, 2LD(d), can be extracted from the domain name d. For example, if d=domain.example.com, then 2LD(d)=example.com.

Referring again to FIG. 4A, in 410, a set of second level domain names, which can be referred to as a 2LD Whitelist, can be checked to see if it contains 2LD(d). A 2LD Whitelist contains a list of second level domain names that are known to be legitimate (for example: ibm.com, google.com, yahoo.com, etc.). If 2LD(d) appears in the 2LD Whitelist, then d is discarded in 435 because it is considered a legitimate second level domain. If 2LD(d) does not appear in the 2LD Whitelist, then further filtration of domain d can continue.

In 415, a set of top level domains, which can be referred to as a Suspicious TLDs set, can be checked to see if it contains TLD(d). The Suspicious TLDs set can contain top level domains that are often associated with malicious and botnet-related domain names (for example: .biz, .info, etc.). If TLD(d) does not appear in the Suspicious TLDs set, then further filtration of d continues. If TLD(d) appears in the Suspicious TLDs set, then d is accepted for further processing in 430. Thus, the full domain name d, or any part of the domain name d can then be further investigated.

In 420, a set of second level domain names, referred to as the Dynamic DNS (DDNS) 2LDs set, can be checked to see if it contains 2LD(d). The DDNS 2LDs set can contain second level domain names owned by Dynamic DNS service providers that may be suspicious (for example: dyndns.org, no-ip.com, yi.org, etc.). If 2LD(d) does not appear in the DDNS 2LDs set, then further filtration of d continues. If 2LD(d) appears in the DDNS 2LDs set, then d is accepted for further processing in 430.

In 425, a set of second level domain names, which can be referred to as New 2LDs set, can be checked to see if it contains 2LD(d). The New 2LDs set can contain second level domains that have never been queried during a previous period of time. For example, if the second level domain "example.com" had not been queried in the previous week, it could be included in the New 2LDs set. If 2LD(d) does not appear in the New 2LDs set, then d is discarded in 435. If 2LD(d) appears in the New 2LDs set, then d is accepted for further processing in 430.

As discussed above, a domain d can be accepted for further processing in 430. In 435, a domain d that has been filtered out by one of the steps 410, 415, 420 or 425 can be discarded, and will not undergo further processing. In 440, the filtration method of FIG. 4A ends.

Figure 4B:
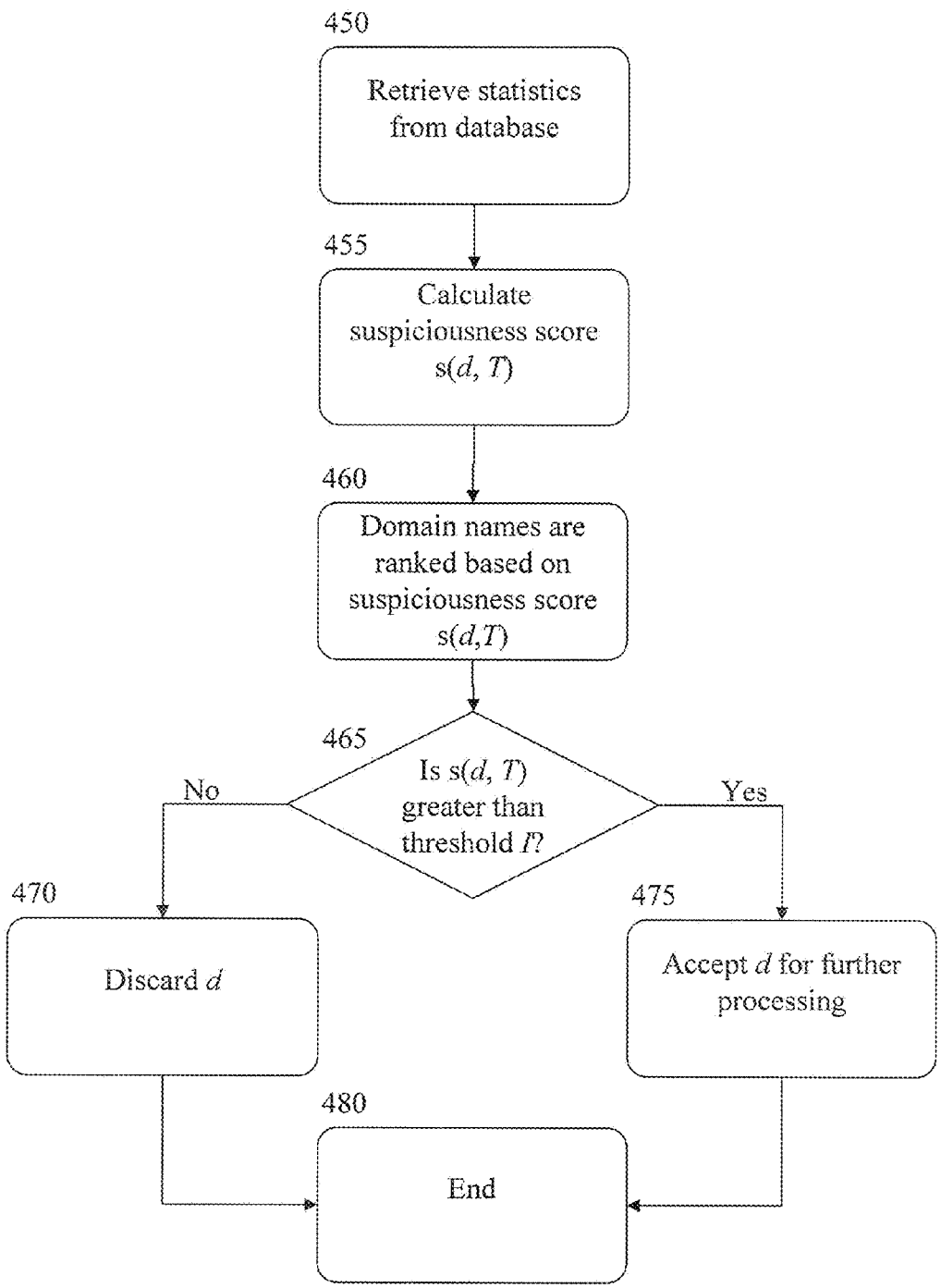
FIG. 4B illustrates details of a method of ranking domain names based on statistics, performed by ranker 145 and as set forth in 225 in FIG. 2, according to one embodiment.

FIG. 4B illustrates details of a method of ranking domain names based on statistics, performed by ranker 145 and as set forth in 225 in FIG. 2, according to one embodiment. In 450, the statistics stored in 220 in database 140 can be retrieved from the database. In 455, a suspiciousness score $s(d, T)$ can be calculated from those statistics. The suspiciousness score $s(d, T)$ can be calculated as a ratio between the number of queries to domain name d observed during the epoch T and the number of distinct source IP addresses that queried domain d during T (i.e., $s(d, T)=$query_volume(d, T)/num_source_IPs(d, T)). For example, assuming that domain name d was queried 100 times during epoch T (i.e., query_volume(d, T)=100) and domain name d was queried by 50 distinct source IP addresses during epoch T (i.e., num_source_IPs(d, T)=50), then $s(d, T)$ can be calculated by dividing 100 by 50. Accordingly, in this example, $s(d, T)=2$. In 460, the domain names can be ranked in order based upon their suspiciousness score $s(d, T)$. For example, assume we have three domain names $d_1$, $d_2$, and $d_3$. Furthermore, assume that $s(d_1, T)=2$, $s(d_2, T)=5$, and $s(d_3, T)=3$. In this example, the domain names could be ranked in order based upon their suspiciousness score, therefore, since 2 is less than 3 which is less than 5, the domain names would be ranked in the following order: $d_1$, $d_3$, $d_2$. In 465, the suspiciousness score $s(d, T)$ can be compared to a threshold I. The value of the threshold I can be varied. For example, I can equal 1, or, in another example, I can equal 50. If $s(d, T)$ is greater than 1, then d can be accepted for further processing in 475. For example, if the suspiciousness score $s(d, T)=2$ and the threshold I=1, then, since 2 is greater than 1, the domain name d is accepted for further processing 475. However, if $s(d, T)$ is less than or equal to threshold I, then d is discarded in 470. For example, if the suspiciousness score $s(d, T)=2$ and the threshold I=3, then, since 2 is less than or equal to 3, the domain name d is discarded in 470. In 480, the ranking method ends.

FIG. 5 illustrates details related to searching for information about domain names by information searcher 150 as set forth in 230 of FIG. 2, according to one embodiment. In 505, an internet search engine can be used to query for a target domain name d. For example, the search engine google.com can be used to query for a given domain name "domain.example.com". A person having ordinary skill in the art can recognize that there are many different internet search engines that can be used in this step, such as, but not limited to, google.com, yahoo.com, and ask.com. Once the query is complete, the top n search results can be collected. For example, the top 10 search results can be collected. The top n search results can then be compared against a list of known malware analysis websites m. The list of known malware analysis websites W could include, but is not limited to, avira.com, viruslist.com, and threatexpert.com. If any of the top n search results contain a link to a known malware analysis website listed in W, then the text of the linked webpage can also be collected. For example, if the top n search results included a link to avira.com, and if avira.com was a part of W, then the linked avira.com page would be collected.

In 510, a reverse DNS lookup can be performed for each IP address that resolved for domain name d. Previously in 220 in FIG. 2, statistics were stored for the resolved IP addresses for d over epoch T (resolved_IPs(d, T)). The set of resolved IP addresses can be represented by R. In 510, for each IP address r in R, a reverse DNS lookup (e.g., PTR DNS) can be performed to retrieve the domain name that points to that address. For example, a reverse DNS lookup can be performed by conducting a DNS query for a pointer record (PTR) by supplying an IP address. The result of the reverse DNS lookup can be the host name associated with the supplied IP address. This information may help identify whether a given IP address is a dynamic IP address or related to a DSL or dial-up connection (for example, "35-201-168-192.dialup.example.net").

In 515, a mapping is performed between each resolved IP address r and the Autonomous System (AS) it belongs to. Given an IP address, the AS number and the AS name to which the IP address belongs can be retrieved using information publicly available on the Internet.

Figure 6:
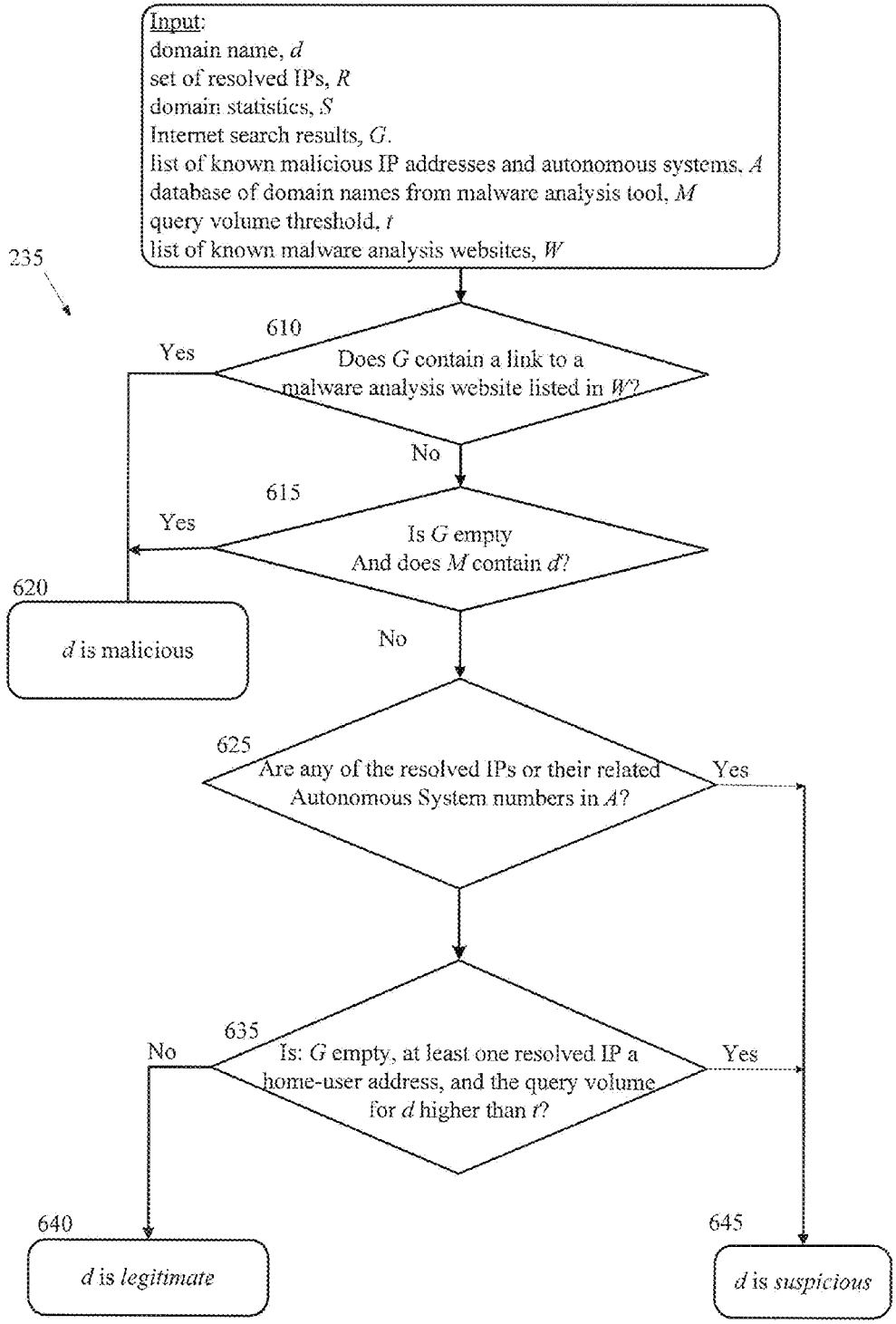
FIG. 6 illustrates details relating to classifying domain names by classifier 155 as set forth in 235 of FIG. 2, according to one embodiment.

FIG. 6 illustrates details relating to classifying domain names by classifier 155 as set forth in 235 of FIG. 2, according to one embodiment. Domain names can be classified into one of three broad categories: malicious, suspicious, or legitimate. The malicious category can include, but is not limited to, domain names that are clearly malware-related and likely to be botnet-related domains. The suspicious category can include, but is not limited to, domains that are likely to be malware-related, but for which further analysis is required. The legitimate category can include, but is not limited to, domain names that are not related to any suspicious activity.

In 605, the input parameters can include, but are not limited to: domain name d, a set of resolved IP addresses R, domain statistics S (as compiled and stored in 215 and 220 on FIG. 2), Internet search results G (as compiled in 230 on FIG. 2), a list of known malicious IP addresses and autonomous systems A, a database of domain names from a malware analysis tool M, a query volume threshold t, and a list of known malware analysis websites W.

In 610, Internet search results G can be checked to see if they contain a link to a malware analysis website using W. If G contains a link to a malware analysis website listed in W, then d can be classified as malicious in 620. For example, if W contained known malware analysis website avira.com, and if Internet search results G contain a link to avira.com, then d can be classified as malicious. If G does not contain a link to any known malware analysis website in W, then further classification of d continues. Thus, for example, if the only known malware analysis website in W is avira.com, and Internet search results G do not contain a link to avira.com then d could be further classified in another step.

In 615, if the Internet search results G are determined to be empty, and if the database of domain names from malware analysis tool M contains the domain name d, then d can be classified as malicious in 620. Otherwise, further classification of d can continue. For example, if d=example.com, and if Internet search results G are empty, and if the database of domain names from malware analysis tools M contains "example.com," then d can be classified as malicious. However, by way of another example, if G is not empty or if M does not contain "example.com" then further classification of d can continue.

In 625, it can be determined whether any of the resolved IP addresses R or their related Autonomous System (AS) numbers are in the list of known malicious IP addresses and autonomous systems A. If the resolved IP addresses or their related AS numbers are found to be in A, then d can be classified as suspicious in 645. Otherwise, further classification of d can continue. For example, if resolved IP addresses R contains IP address "123.123.123.123" and A also contains "123.123.123.123," then d could be classified as suspicious. However, if A does not contain any of the IP addresses in R or their related AS numbers, then further classification of d could continue.

In 635, Internet search results G can be checked to see if the result is empty. For example, this criteria would be satisfied if the Internet search results G did not contain any data. On the other hand, by way of example, this criteria would not be satisfied if Internet search results G did contain some search results. Additionally, R can be checked to see if it contains at least one IP address that is a home-user address in 635. For example, this criteria could be satisfied if IP address "123.123.123.123" was known to be a home-user address and the set of resolved IP addresses R contained "123.123.123.123". On the other hand, by way of example, this criteria would not be satisfied if R did not contain "123.123.123.123." Additionally, the query volume for d can be checked to see if it is higher than a provided query volume threshold t in 635. For example, the query volume threshold t can be set to 1,000 queries. In this example, if the query volume for d was 2,000 queries, the query volume 2,000 is greater than the threshold 1,000, and accordingly this criteria would be satisfied. However, if the query volume for d was 500 queries, the query volume of 500 would be less than the threshold of 1,000, and accordingly the criteria would not be satisfied. If all of three criteria are satisfied, then the domain name d can be classified as suspicious in 645. Otherwise, d can be classified as legitimate in 640.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

The invention claimed is:

1. A method of detecting at least one malicious and/or botnet-related domain name, comprising:
    performing processing associated with collecting at least one domain name by monitoring Domain Name System (DNS) traffic in at least one network;
    performing processing associated with obtaining, during a time period, information about the at least one domain name, comprising determining if the at least one domain name is in at least one domain name white list;
    wherein the obtained information further comprises statistics related to the at least one domain name comprising a total number of queries to the at least one domain name during the time period and a total number of distinct source IP addresses that queried the at least one domain name during the time period;
    responsive to determining that the at least one domain name is not in the at least one domain name white list, performing processing associated with automatically obtaining, using at least one Internet search engine, search results for the at least one domain name;
    performing processing associated with analyzing the search results to determine whether at least one search result associated with the at least one domain name comprises a known malware site; and
    performing processing associated with classifying the at least one domain name as at least one of malicious, suspicious, and legitimate based on the analyzed search results.

2. The method of claim 1, further comprising, calculating a suspiciousness score based on the total number of queries to the at least one domain name during the time period and the total number of distinct source IP addresses that queried the at least one domain name during the time period,
    wherein the classifying the at least one domain name as at least one of malicious, suspicious, and legitimate is further based on the suspiciousness score.

3. The method of claim 1, wherein the at least one domain name to be monitored is part of at least one sample chosen from a plurality of domain names; and
    wherein a size of the at least one sample is based on a probability factor.

4. The method of claim 3, further comprising generating a pseudorandom number;
    wherein the at least one domain name is not selected for monitoring if the probability factor is less than the pseudorandom number.

5. The method of claim 2, wherein the at least one domain name is ranked based on the suspiciousness score, and
    wherein the classifying the at least one domain name as at least one of malicious, suspicious, and legitimate is further based the ranking being above a predetermined threshold.

6. The method of claim 1, wherein the obtained information further comprises performing at least one reverse lookup on the at least one domain name.

7. The method of claim 1, wherein the at least one domain name to be monitored is filtered.

8. The method of claim 1, wherein the at least one domain name to be monitored is filtered by determining if a second level domain (2LD) of the at least one domain name is in at least one domain name white list.

9. The method of claim 8, wherein the at least one domain name to be monitored is further filtered by determining if a top level domain (TLD) of the at least one domain name is in at least one domain name suspicious list.

10. The method of claim 9, wherein the at least one domain name to be monitored is further filtered by determining if the second level domain (2LD) of the at least one domain name is in a Dynamic Domain Name System (DDNS) 2LD suspicious list.

11. The method of claim 1, wherein the obtained information further comprises:
    determining whether a resolved IP address of the at least one domain name is that of at least one DSL or at least one dial-up connection; and/or
    determining a geographic location of the at least one resolved IP address, at least one Autonomous System (AS) number, or at least one AS name.

12. A computerized system for performing malware analysis on at least one guest environment, the system comprising:
    at least one server coupled to at least one network;
    at least one user terminal coupled to the at least one network;
    at least one application coupled to the at least one server and/or the at least one user terminal, wherein the at least one application is configured for:
    performing processing associated with collecting at least one domain name by monitoring Domain Name System (DNS) traffic in at least one network;
    performing processing associated with obtaining information about the at least one domain name, wherein the information is utilized to classify the at least one domain name, and the information is information about the at least one domain name in at least one domain name white list;
    wherein the obtained information further comprises statistics related to the at least one domain name comprising a total number of queries to the at least one domain name during the time period and a total number of distinct source IP addresses that queried the at least one domain name during the time period;
    responsive to determining that the at least one domain name is not in the at least one domain name white list, performing processing associated with automatically obtaining, using at least one Internet search engine, search results for the at least one domain name;
    performing processing associated with analyzing the search results to determine whether at least one search result associated with the at least one domain name comprises a known malware site; and
    performing processing associated with determining at least one likelihood that the at least one domain name is being used as at least one command and control domain for at least one botnet based at least in part on the analyzed search results.

13. The system of claim 12, wherein the at least one domain name is monitored and statistics are gathered related to the at least one domain name.

14. The system of claim 13, wherein the at least one domain name to be monitored is part of at least one sample chosen from a plurality of domain names.

15. The system of claim 12, wherein the at least one domain name is further classified as malicious or suspicious based on the analyzed search results.

16. The system of claim 12, wherein the at least one domain name is ranked based on probabilities related to at least one of how malicious the at least one domain name is and how botnet-related the at least one domain name is,
    wherein the determining at least one likelihood that the at least one domain name is being used as at least one command and control domain for at least one botnet is based on the rank.

17. The system of claim 12, wherein the information further comprises performing at least one reverse lookup on the at least one domain name.

18. The system of claim 12, wherein the at least one domain name to be monitored is filtered.

19. The system of claim 12, wherein the at least one domain name to be monitored is filtered by determining if a second level domain (2LD) of the at least one domain name is in at least one domain name white list.

20. The system of claim 19, wherein the at least one domain name to be monitored is further filtered by determining if a top level domain (TLD) of the at least one domain name is in at least one domain name suspicious list.

21. The system of claim 20, wherein the at least one domain name to be monitored is further filtered by determining if the second level domain (2LD) of the at least one domain name is in a Dynamic Domain Name System (DDNS) 2LD suspicious list.

22. The system of claim 12, wherein the information is related to at least one of:
    information regarding whether or not a resolved IP address of the at least one domain name is that of at least one DSL or at least one dial-up connection; and
    information on geographic location of the at least one resolved IP address, at least one Autonomous System (AS) number, or at least one AS name.

* * * * *